United States Patent [19]

Popovic et al.

[11] Patent Number: 5,966,140
[45] Date of Patent: Oct. 12, 1999

[54] METHOD FOR CREATING PROGRESSIVE SIMPLICIAL COMPLEXES

[75] Inventors: Jovan Popovic, Pittsburgh, Pa.; Hugues H. Hoppe, Seattle, Wash.

[73] Assignee: Microsoft Corporation, Redmond, Wash.

[21] Appl. No.: 08/880,090

[22] Filed: Jun. 20, 1997

[51] Int. Cl.⁶ .................................................. G06F 15/00
[52] U.S. Cl. ............................................................ 345/441
[58] Field of Search .................................. 345/433, 419, 345/441, 442, 443

[56] References Cited

U.S. PATENT DOCUMENTS 4,719,571  1/1988  Rissanen et al. ....................... 364/300

OTHER PUBLICATIONS

"Mulit–Resolution 3D Approximations for Rendering Complex Scenes," *Modeling In Computer Graphics*, by Jarek Rossignac and Paul Borrel, pp. 455–465 (1993).
"Generating Multiple Levels of Detail from Polygonal Geometry Models," *Virtual Environments '95 (Eurographics Workshop On Virtual Environments)*, by G. Schaufler and W. Sturzlinger, pp. 33–41 (1995).
"Hierarchical Structures for Dynamic Polygonal Simplification TR 96–006," by David Luebke, Department of Computer Science, University of North Carolina at Chapel Hill, pp. 3–7 (1996).
"Dimension–Independent Modeling with Simplicial Complexes," *ACM Transactions on Graphics*, vol. 12, No. 1, by A. Paoluzzi, F. Bernardini, C. Cattani, and V. Ferrucci, pp. 56–102 (1993).
"Multiresolution Representation of Volume Data Through Hierarchical Simplicial Complexes,"*Aspects of Visual Form Processing*, by M. Bertolotto, L. De Floriani, E. Bruzzone, and E. Puppo, pp. 73–82 (1994).

"Pyramidal Simplicial Complexes," *Solid Modeling '95*, by M. Bertolotto, L. De Floriani, and P. Marzano, Department of Computer and Information Sciences, University Of Genova, pp. 153–162 (1995).
"The Radial Edge Structure: A Topical Representation for Non–Manifold Geometric Boundary Modeling," *Geometric Modeling for CAD Applications*, By Kevin Weiler, pp. 3–36 (1988).
"Controlled Topology Simplification," *IEEE Transactions on Visualization and Computer Graphics* vol. 2, No. 2, by Taosong He, Lichan Hong, Amitabh Varshney, and Sidney W. Wang, pp. 171–184 (1996).
"Algebraic Topology," by Edwin H. Spanier, Professor of Mathematics, University of California, Berkeley, chapter 3, pp. 107–153 (1966).
"Progressive Meshes," *Computer Graphics Proceedings, Annual Conference Series*, by Hugues H. Hoppe, pp. 99–108 (1996).

*Primary Examiner*—Phu K. Nguyen
*Attorney, Agent, or Firm*—Klarquist Sparkman Campbell Leigh & Whinston, LLP

[57] ABSTRACT

A method for creating progressive simplicial complexes (PSC), including a new format for storing and transmitting arbitrary geometric models for computer graphics is presented. A PSC captures a graphical model as a coarse base model together with a sequence of refinement transformations that progressively recover detail. The PSC method uses general refinement transformations, allowing the given model to be an arbitrary triangulation of a complex shape, and the base model to be a single vertex. The PSC model defines a continuous sequence of approximating models for run-time level-of-detail control, allows smooth transitions between any pair of models in the sequence, supports compression, progressive transmission on computer network like the Internet or an intranet, and offers a space-efficient representation of an arbitrary geometric model.

43 Claims, 17 Drawing Sheets

(4 of 17 Drawing Sheet(s) Filed in Color)

STAR({j})

STAR({j,k})

PRIOR ART

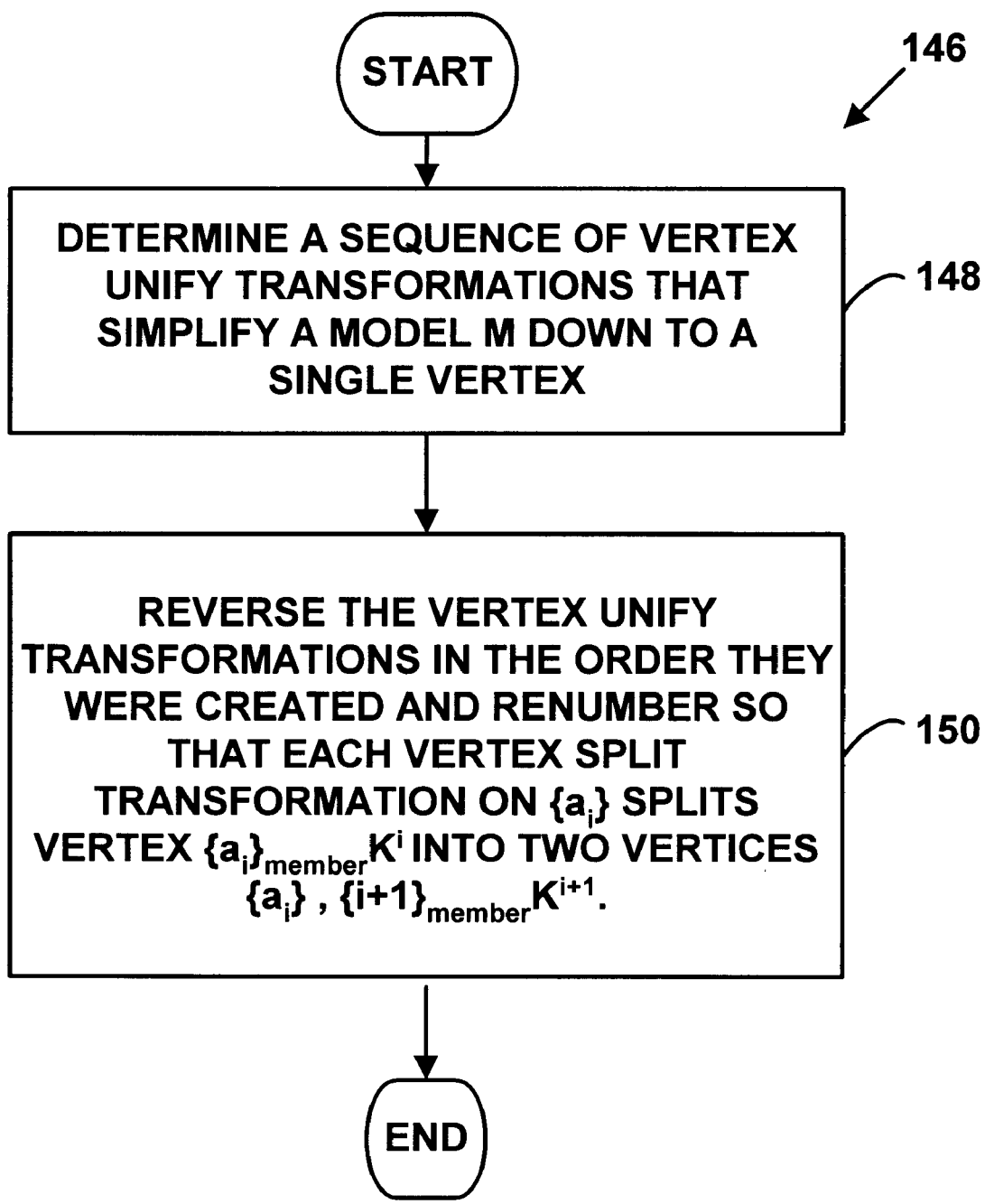

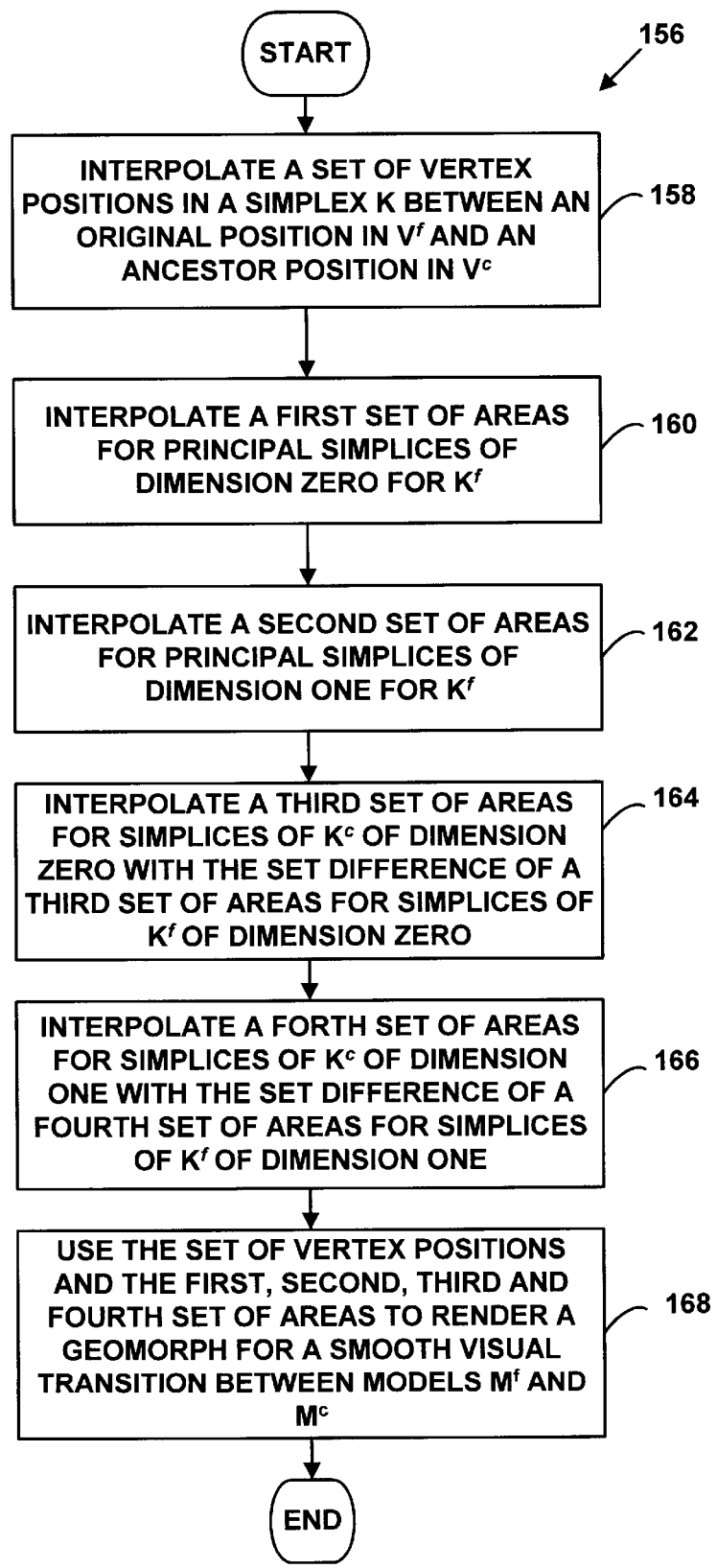

FIG. 10A
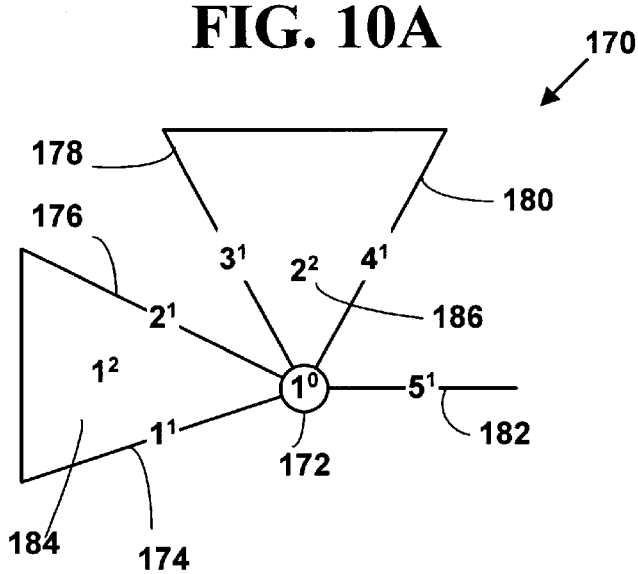
FIG. 10B
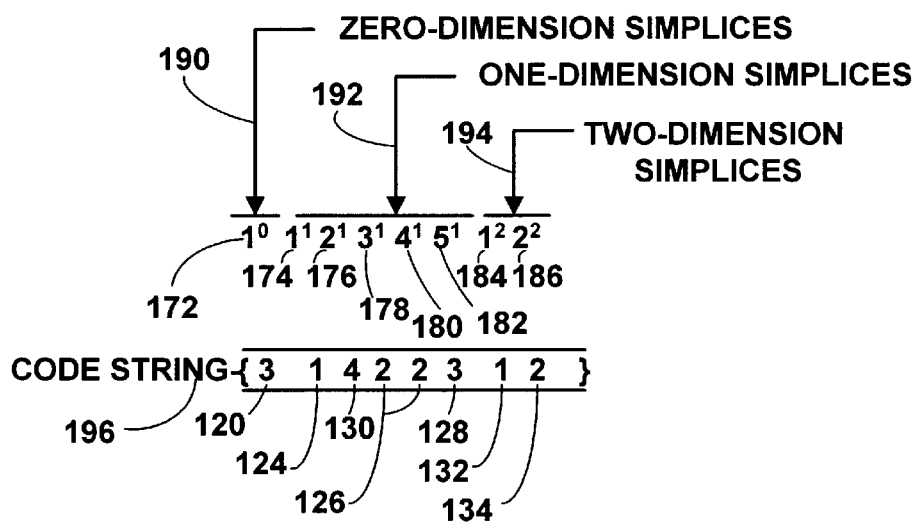
FIG. 10C
| DIMENSION | 0 | 1 | | | | | 2 | |
|---|---|---|---|---|---|---|---|---|
| ID | $1^0$ | $1^1$ | $2^1$ | $3^1$ | $4^1$ | $5^1$ | $1^2$ | $2^2$ |
| VSPLIT | | ① | 1 | 1 | 1 | ✗ | ① | ✗ |
| CODE(X) | | 2 | ✗ | ② | ② | 2 | ✗ | ② |
| FROM | ③ | 3 | 3 | 3 | 3 | ③ | ✗ | ✗ |
| FIG. 7 | ✗ | 4 | ④ | 4 | 4 | 4 | ✗ | ✗ |

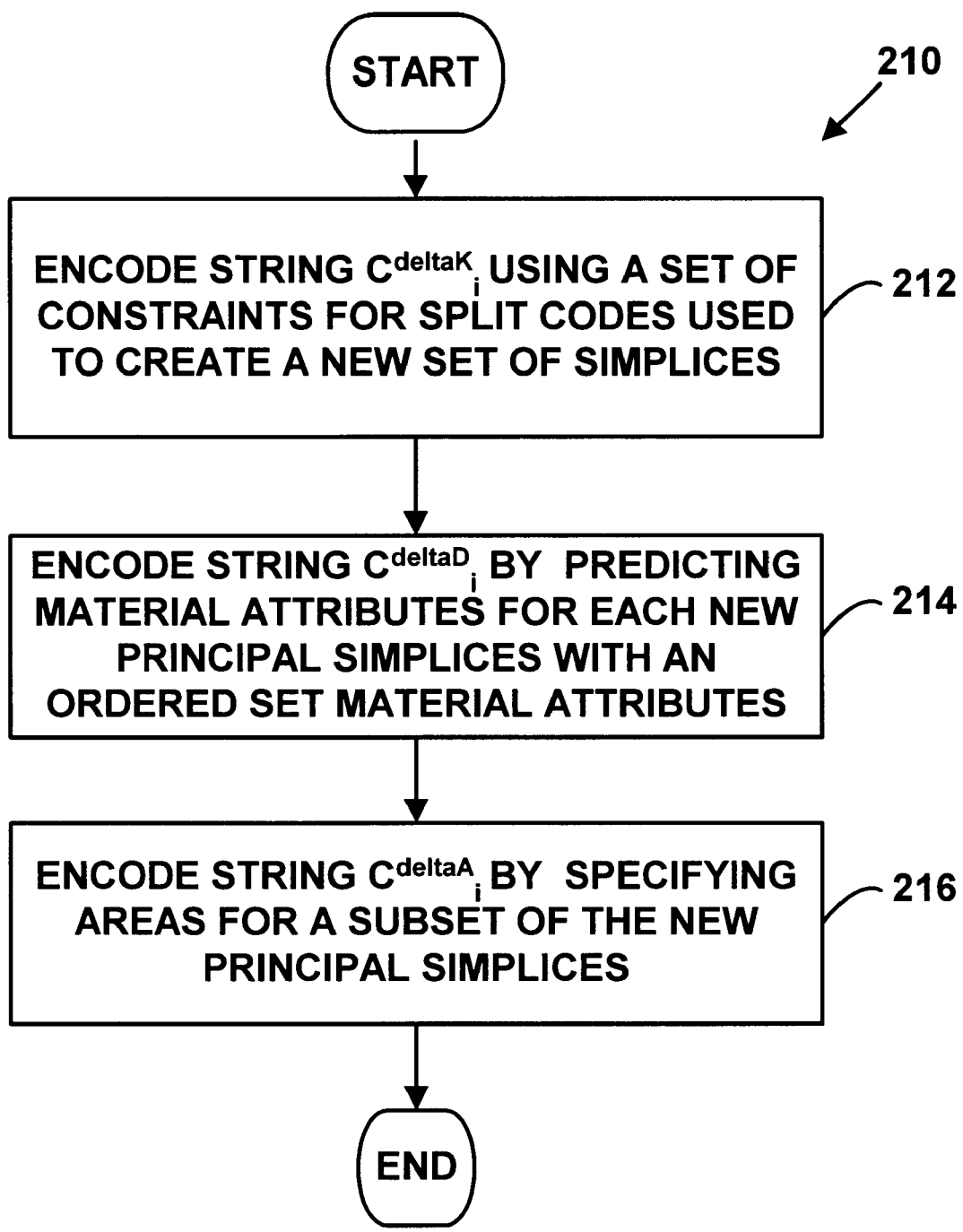

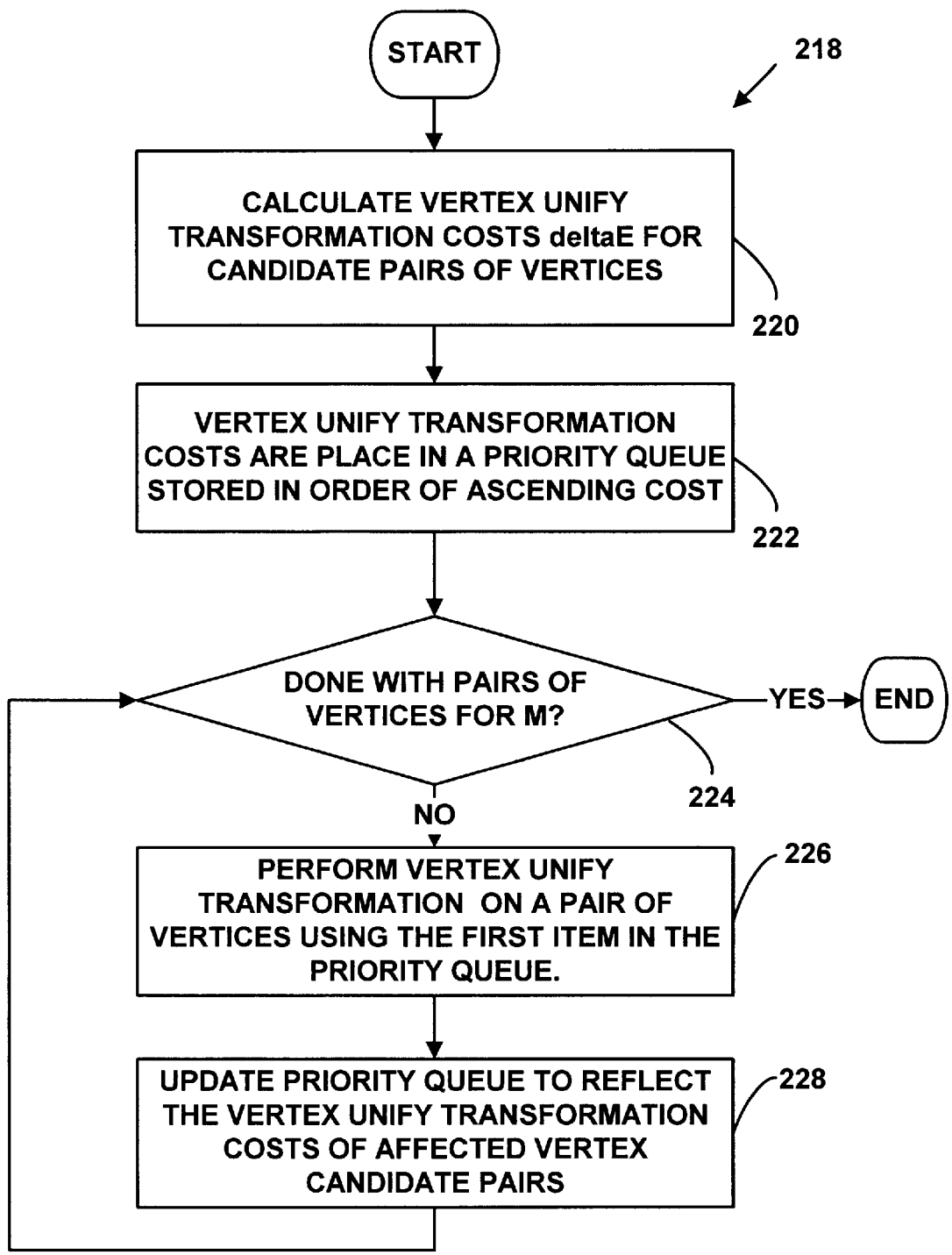

FIG. 14
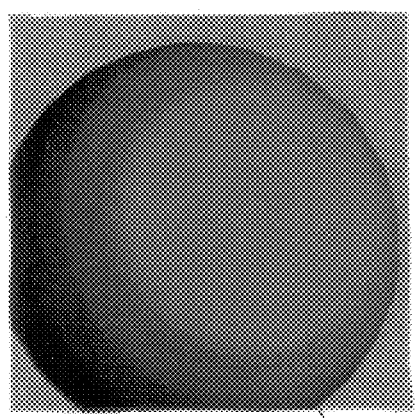
260
(A)
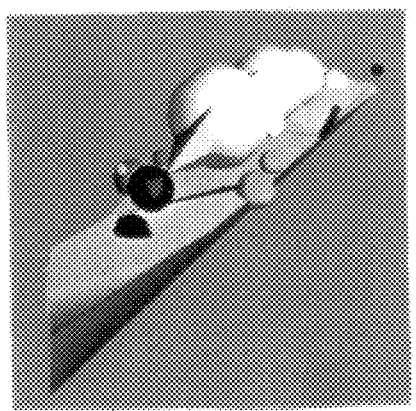
262
(B)
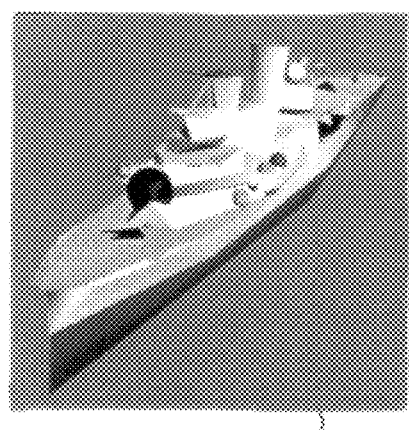
264
(C)
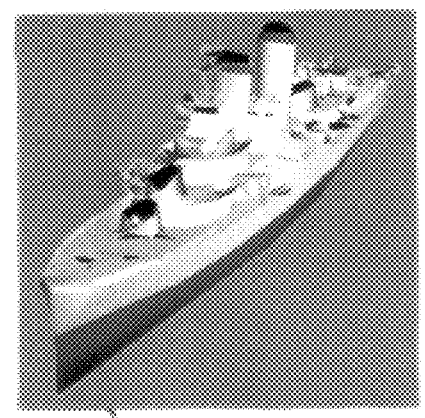
266
(D)
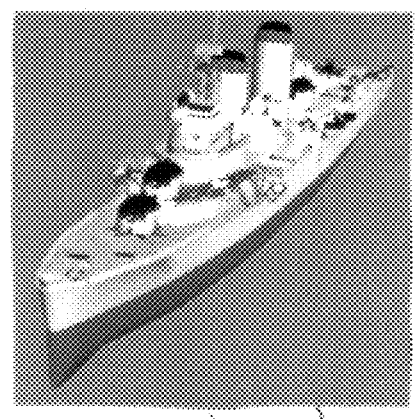
268
(E)
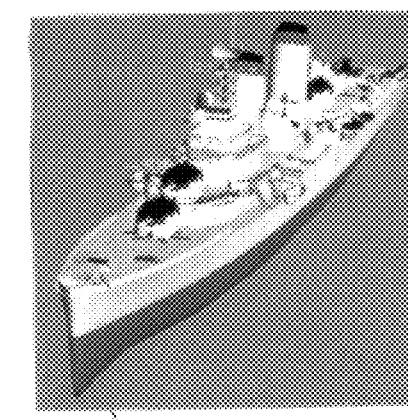
270
(F)

FIG. 15
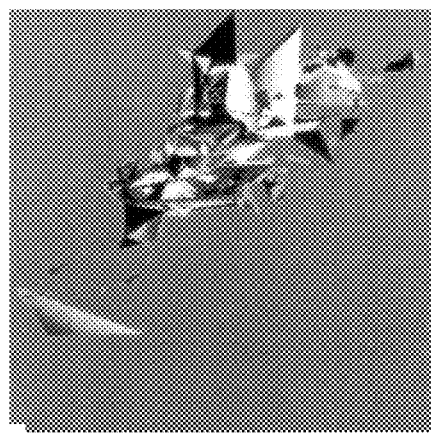
272
(A)
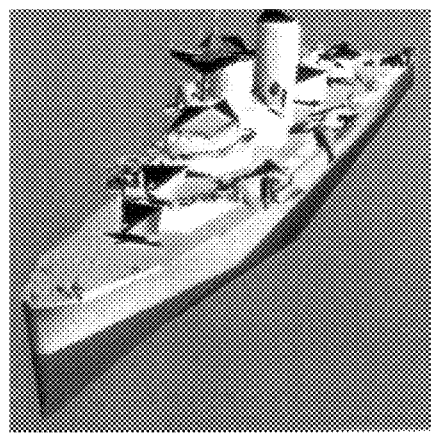
274
(B)
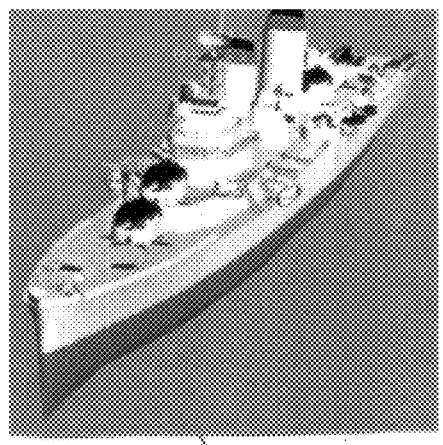
276
(C)

FIG. 16
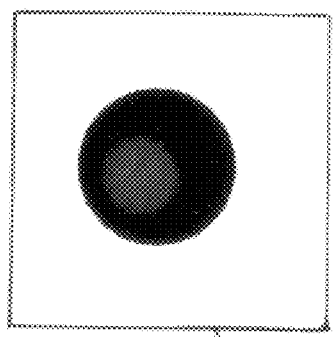
278
(A)
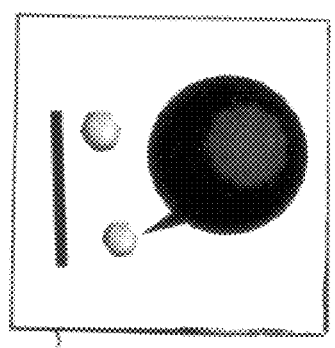
280
(B)
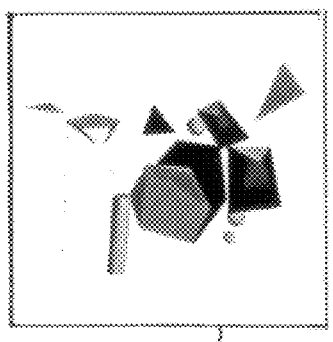
282
(C)
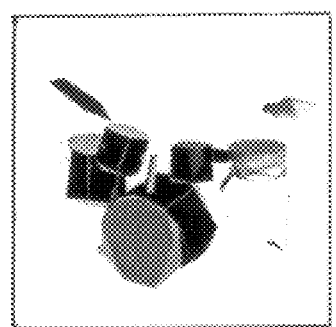
284
(D)
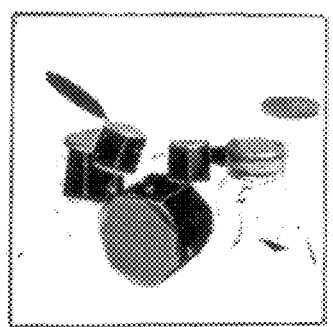
286
(E)
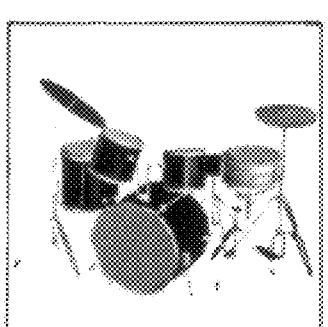
288
(F)

FIG. 17
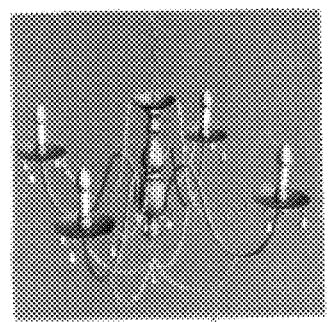
292
(A)
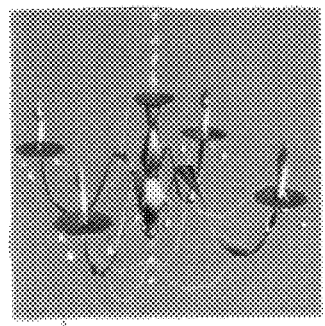
294
(B)
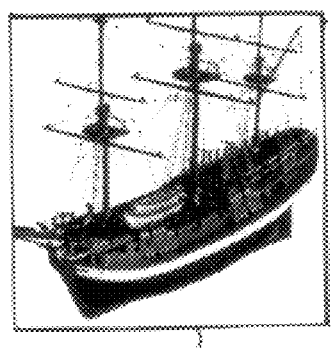
296
(C)
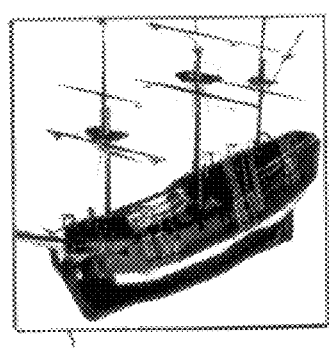
298
(D)
300
(E)
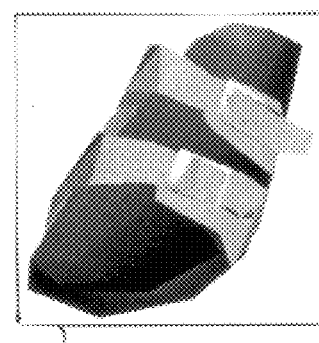
302
(F)

METHOD FOR CREATING PROGRESSIVE SIMPLICIAL COMPLEXES

COPYRIGHT AUTHORIZATION

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights.

FIELD OF INVENTION

The present invention relates to computer graphics. More particularly, the present invention relates to rendering complex geometric models for graphical objects.

BACKGROUND AND SUMMARY OF THE INVENTION

Rendering complex geometric models at interactive rates is a challenging problem in computer graphics. While rendering performance is continually improving, significant gains can be obtained by adapting the complexity of a geometric model to its contribution to a rendered graphical image. Within traditional modeling systems known in the computer graphics art, detailed geometric models are created by applying versatile modeling operations (e.g., extrusion, constructive solid geometry, and freeform deformations) to a vast array of geometric primitives used to define a graphical object or image. The geometric primitives typically include triangles, polygons, and other multi-sided shapes. For efficient display, the resulting geometric models are often transformed into polygonal approximations called "meshes."

Modeling systems for computer graphics and three-dimensional scanning systems commonly produce triangle meshes of high complexity. The geometry of a triangulated model used for a triangle mesh is typically denoted as a tuple (K, V) where the abstract simplicial complex K is a combinatorial structure specifying the adjacency of vertices, edges, faces, etc. in a geometric model, and V is a set of vertex positions specifying the shape of the model in $R^3$ space.

High complexity triangle meshes are difficult to render, store and transmit within a computer graphics system. One approach to speed up rendering is to replace a complex triangular mesh by a set of level-of-detail (LOD) approximations. For rendering, level-of-detail approximations can be precomputed automatically using mesh simplification methods know in the art. For efficient storage and transmission, effective mesh compression schemes known in the art are used.

High complexity meshes are often stored as progressive meshes. In progressive mesh form, an arbitrary mesh $M^n$ is stored as a coarse bash mesh $M^0$ together with a sequence of N-data structure records that indicate how to incrementally refine $M^0$ into $M^n$. The data structure records encodes information associated with elementary transformations on the mesh. In addition to defining a continuous sequence of approximations, $M^0, \ldots, M^n$, the progressive mesh representation supports smooth visual transitions (e.g., geomorphs), allows progressive transmission of mesh data, and provides an effective mesh progressive scheme. For more information see, "Progressive Meshes," by Hugues Hoppe, *ACM SIGGRAPH '96 Proceedings*, pp. 99–108.

Using progressive mesh representations for geometric modeling in computer graphics has several drawbacks. One drawback with progressive mesh representations is that they can only represent triangulations used for triangular models that correspond to orientable two-dimensional manifolds. As is known in the art, a manifold is a topological space defined such that every point has a neighborhood which is homeomorphic (i.e., has a continuous one-to-one mapping) to the interior of a sphere in Euclidean space of the same number of dimensions. A neighborhood for a manifold is the set of all points whose distances from a given point fall within a pre-determined range.

Triangulated models that cannot be represented by progressive mesh representations include one-dimensional manifolds (e.g., open and closed curves), higher dimensional polyhedra (e.g., triangulated volumes), non-orientable surfaces (e.g., Mobius strips), non-manifolds (e.g., two cubes joined along an edge), and geometric models of mixed dimensionality. As is known in the art, a Mobius strip is a one-edged geometric surface with only one continuous side, formed by giving a 180° twist to a narrow, rectangular strip and then connecting the two ends together.

Another problem associated with progressive mesh representations is that the expression of the progressive mesh transformations constrains all meshes in the progressive mesh sequence $M^0, \ldots, M^n$ to have the same topological type. Thus, when a progressive mesh representation is topologically complex, the simplified base mesh $M^0$ in the progressive mesh representation may still have multiple geometric shapes instead of a single geometric shape. For example, if a triangular progressive mesh representation $M^\wedge$ is topologically complex, a simplified base mesh $M^0$ in a progressive mesh representation may be reduced to multiple triangles instead of a single triangle which is the desired simplification.

A problem with triangulated models is that using simplification techniques known in the art, triangles can not be simplified into lower-dimensional representations when a coarser approximation of a model is created. This limits the type of coarser approximation that can be created. One simplification technique known in the art is to encode a sequence of geometric models using a sequence of vertex split transformations and allow the topological type of the models to change during the refinement. However, only triangles of the model are tracked, and arbitrary primitives cannot be encoded. Triangles that collapse are removed from the model. Thus, triangles cannot be collapsed into edges, and edges cannot be collapsed into vertices, thereby limiting the coarser model. See "Smooth Levels of Detail" by Dieter Schmalstieg and Gemot Schaufler, *Proceedings of IEEE 1997 Virtual Reality Annual International Symposium*, 1997, pp. 12–19 for more information.

In accordance with an illustrative embodiment of the current invention, the problems associated with using progressive mesh representations and triangulated models for complex geometric models in computer graphics are overcome. A method for creating a generalized representation of an arbitrary geometric model using a progressive simplicial complex that permits topological changes in the geometric model is presented. As is known in the art, a simplicial complex is a set of elements called "simplices" which are contained within a Euclidean space of a specified number of dimensions. The simplices have one more boundary point (e.g., d+1) than the specified number of dimensions (e.g., d) being used. A simplex of zero dimensions is a point, of one dimension is a line segment or edge, of two dimensions is a triangle and its interior, of three dimensions is a tetrahedron and its interior, etc. In an illustrative embodiment of the present invention, the progressive simplicial complex expresses an arbitrary geometric model (e.g., including a model of any dimension, non-orientable, non-manifold models and models of mixed dimensionality) as a single vertex and a set of transformation data determined as a result of successive refinements applied to an initial approximation. The single vertex and set of transformation data is useful for rendering the geometric model and transmitting the geometric model over a computer network like the Internet or an intranet for use in computer games and other applications.

In an illustrative embodiment of the present invention, an arbitrary geometric model M comprises a tuple (K, V, D, A) where tuple member K is a simplicial complex, tuple member V is a set of vertex positions that determine the geometric realization of K, tuple member D is a set of simplex attributes, and tuple member A is a set of areas for the principal simplices of K. However, more or fewer tuple members could be used in the geometric model (e.g., M=(K, V)).

The method for creating progressive simplicial complexes includes approximating an arbitrary geometric model M stored as a first approximation $M^i$, where $M^i$ has i-vertices. The first approximation $M^i$ is transformed with a progressive simplicial complex transformation $t^i$ to create a second approximation $M^{i-1}$, where the second approximation $M^{i-1}$ has i−1 vertices. The progressive simplicial complex transformation $t^{i-1}$ transforms one or more of $K^i$, $V^i$, $D^i$ or $A^i$ to create $M^{i-1}$ and will be explained in detail below. As each progressive simplicial complex transformation is completed, transformation data is recorded which allows the transformation to be inverted at a later time.

The progressive simplicial complex transformations are repeated on the approximations until a final approximation $M^f$ is created that has a predetermined number of vertices. In an illustrative embodiment of the present invention, the final approximation has one vertex $M^f=M^1$. However, other final approximations containing more than one vertex could also be used (e.g., $M^f=M^2$, $M^f=M^3$, etc.) The final approximation $M^1$ and the set of saved transformation data corresponding to transformations $\{t^{i-1}, \ldots, t^1\}$ forms a progressive simplicial complex P. That is, the tuple $(M^1, \{t^{i-1}, \ldots, t^1\})$ forms a progressive simplicial complex representation P of the geometric model M where $M_1$ is the final approximation within one vertex and $\{t^{i-1}, \ldots, t^1\}$ is the set of transformations.

The method for creating a progressive simplicial complex allows any arbitrary geometric model M (e.g., a model of any dimension, non-orientable, non-manifold, mixed dimensional, etc.) to be expressed as a progressive simplicial complex. Successive refinements with transformations on the progressive simplicial complex result in a principal simplex with a single vertex. A principal simplex has no parent in the progressive simplicial complex. A parent is a top most entity in a hierarchical scheme. The successive refinement encodes changes to both the geometry and topology of the arbitrary model M. Thus, both geometric and topological complexity can be recovered progressively using the progressive simplicial complex and the geometric model is not constrained to one topology type. The progressive simplicial complex can be used for progressive transmission of an approximated geometric model over a computer network such as the Internet or an intranet for a real-time computer game or other application. It also allows easier rendering of an arbitrary geometric model M.

The foregoing and other features and advantages of an illustrative embodiment of the present invention will be more readily apparent from the following detailed description, which proceeds with reference to the accompanying drawings.

BRIEF DESCRIPTION OF THE DRAWINGS

The file of this patent contains at least one drawing executed in color. Copies of this patent with color drawings (s) will be provided by the Patent and Trademark Office upon request and payment of the necessary fee.

Certain ones of the drawings executed as color are images of progressive simplicial complexes created from datasets which was originally created and copyrighted by Viewpoint Datalabs International of Provo, Utah.

FIG. 8 is a flow diagram illustrating a method for representing progressive simplicial complexes.

FIG. 9 is a flow diagram illustrating a method for creating a geomorph for a progressive simplicial complex.

FIGS. 10A–10C are a block diagrams illustrating slit code encoding.

FIG. 11 is a flow diagram illustrating a method for compressing a progressive simplicial complex.

FIG. 12 is a flow diagram illustrating a method for iteratively choosing pairs of vertices to unify in order to construct a progressive simplicial complex.

FIGS. 14A–14F are color block diagrams of color screen shots illustrating progressive simplicial complex approximations for a model of a graphical destroyer.

FIGS. 15A–15C and are color block diagrams of color screen shots illustrating a progressive mesh representation from the prior art of a graphical destroyer without progressive simplicial complexes.

FIGS. 16A–16F are color block diagrams illustrating progressive simplicial complex approximations for a model of a graphical drum set.

FIGS. 17A–17F are color block diagrams illustrating progressive simplicial complex approximations for various graphical models and the original graphical models for comparison.

DETAILED DESCRIPTION OF AN ILLUSTRATIVE EMBODIMENT

Figure 1:
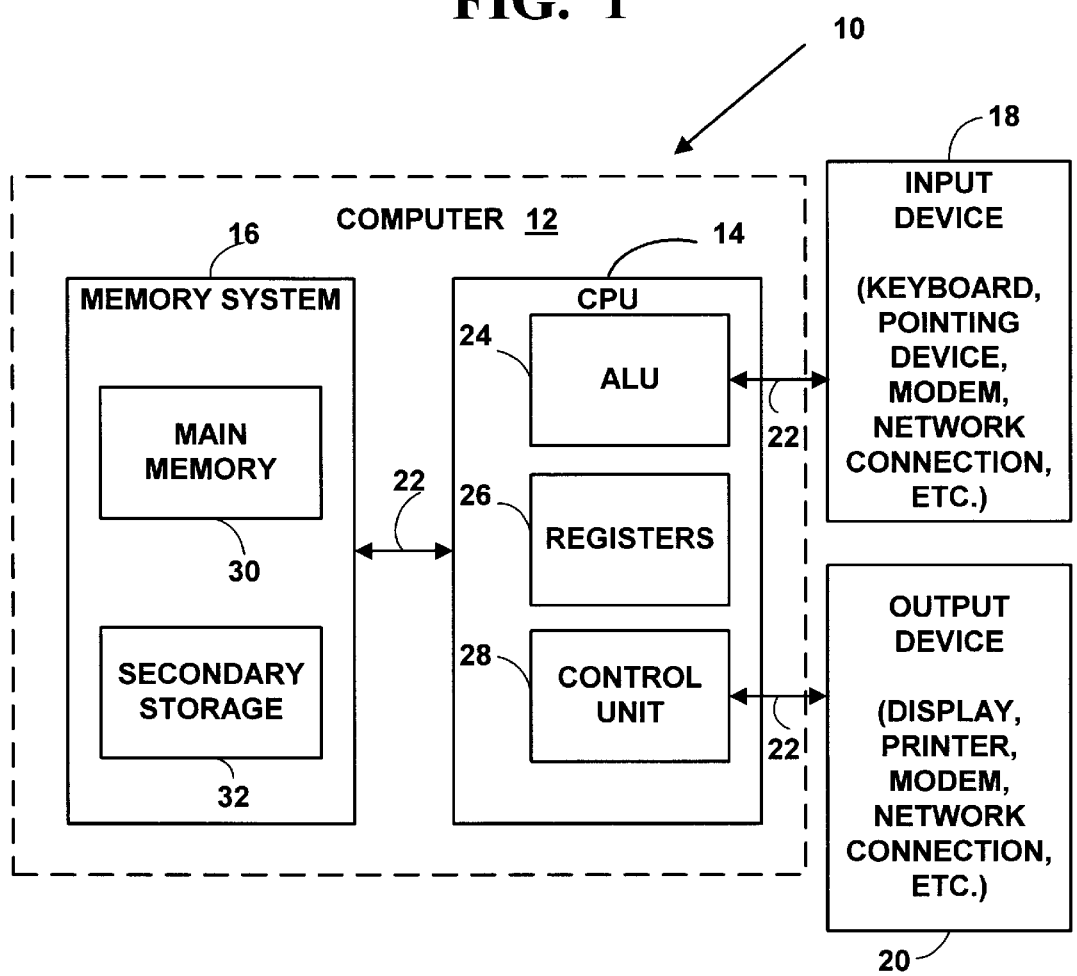
FIG. 1 is a block diagram of a computer system used to implement an illustrative embodiment of the present invention.

FIG. 1 is a block diagram of a computer system used to implement an illustrative embodiment of the present invention. Referring to FIG. 1, an operating environment for the preferred embodiment of the present invention is a computer system 10 with a computer 12 that comprises at least one high speed processing unit (CPU) 14, in conjunction with a memory system 16, an input device 18, and an output device 20. These elements are interconnected by a bus structure 22.

The illustrated CPU 14 is of familiar design and includes an ALU 24 for performing computations, a collection of registers 26 for temporary storage of data and instructions, and a control unit 28 for controlling operation of the system 10. Any of a variety of processors, including those from Digital Equipment, Sun, MIPS, IBM, Motorola, NEC, Intel, Cyrix, AMD, Nexgen and others are equally preferred for CPU 14. Although shown with one CPU 14, computer system 10 may alternatively include multiple processing units.

The memory system 16 includes main memory 30 and secondary storage 32. Illustrated main memory 30 is high speed random access memory (RAM) and read only memory (ROM). Main memory 30 can include any additional or alternative high speed memory device or memory circuitry. Secondary storage 32 takes the form of long term storage, such as ROM, optical or magnetic disks, organic memory or any other volatile or non-volatile mass storage system. Those skilled in the art will recognize that memory 16 can comprise a variety and/or combination of alternative components.

The input and output devices 18, 20 are also familiar. The input device 18 can comprise a keyboard, mouse, pointing device, audio device (e.g., a microphone, etc.), or any other device providing input to the computer system 10. The output device 20 can comprise a display, a printer, an audio device (e.g., a speaker, etc.), or other device providing output to the computer system 10. The input/output devices 18, 20 can also include network connections, modems, or other devices used for communications with other computer systems or devices.

As is familiar to those skilled in the art, the computer system 10 further includes an operating system and at least one application program. The operating system is a set of software instructions which controls the computer system's operation and the allocation of resources. The application program is a set of software instructions that performs a task desired by the user, making use of computer resources made available through the operating system. Both are resident in the illustrated memory system 16.

In accordance with the practices of persons skilled in the art of computer programming, the present invention is described below with reference to acts and symbolic representations of operations that are performed by computer system 10, unless indicated otherwise. Such acts and operations are sometimes referred to as being computer-executed. It will be appreciated that the acts and symbolically represented operations include the manipulation by the CPU 14 of electrical signals representing data bits which causes a resulting transformation or reduction of the electrical signal representation, and the maintenance of data bits at memory locations in memory system 16 to thereby reconfigure or otherwise alter the computer system's operation, as well as other processing of signals. The memory locations where data bits are maintained are physical locations that have particular electrical, magnetic, optical, or organic properties corresponding to the data bits.

The data bits may also be maintained on a computer readable medium including magnetic disks, and any other volatile or non-volatile mass storage system readable by the computer 12. The computer readable medium includes cooperating or interconnected computer readable media, which exist exclusively on computer system 10 or are distributed among multiple interconnected computer systems 10 that may be local or remote.

Rendering a Graphical Object

To generate a graphical object, detailed geometric models are created by applying modeling operations to geometric primitives used to define the graphical object. The geometric primitives typically include triangles, polygons, and other multi-sided shapes. To render a graphical image, graphical objects are processed and the resulting graphical image is stored in a frame buffer (e.g., memory system 16, FIG. 1). The frame buffer contains a frame of graphical data. The rendered image data is then transferred to a display (e.g., display 20, FIG. 1). Graphical data is stored in frames of a pre-determined size (e.g., 32 mega-bytes). A graphical image is typically rendered frame-by frame. For more information on rendering, see *Fundamentals of Interactive Computer Graphics*, 2nd Edition, by J. D. Foley and A. Van Dam, Addison-Wesley Publishers.

For efficient display in a frame, the resulting geometric models are typically transformed into polygonal approximations called "meshes." A mesh has a geometry which can be denoted by a tuple (K, V) where K is an abstract simplicial complex specifying the connectivity of the mesh simplices (i.e., the adjacency of the vertices, edges, faces, triangles, etc.) of a geometric model, and $V=\{v_1, \ldots v_m\}$, is the set of vertex positions defining the shape of the mesh in $R^3$ space. That is, a parametric domain $|K| \subset R^m$ is constructed by identifying each vertex in K with a canonical basis vector of $R^m$, and defining the mesh as an image $\phi v(|K|)$ where $\phi v$: $R^m—R^3$ is a linear map. As is known in the art, a simplicial complex is a set of elements called simplices which are contained within a Euclidean space of a specified number of dimensions. The simplices have one more boundary point (e.g., d+1) than the specified number of dimensions (e.g., d) being used. A simplex of dimension zero is a point, of dimension one is a line segment or edge, of dimension two is a triangle and its interior, of dimension three is a tetrahedron and its interior, etc..

A simplicial complex K in a mesh consists of the set of vertices $\{1, \ldots, m\}$ together with a set of non-empty subsets of the vertices, called the simplices of K, such that a set consisting of exactly one vertex is a simplex in K, and every non-empty subset in K is also a simplex in K.

A simplex containing exactly (d+1) vertices has dimension-d and is called a d-simplex. The faces of the simplex-s denoted as "$\bar{s}$," are the set of non-empty subsets of s. The star of {s}, denoted "star({s})," is the set of simplices of which s is a face. The children of a d-simplex $\bar{s}$ are the (d−1) simplices of $\bar{s}$, and its parents are the (d+1) simplices of star({s}). A simplex with exactly one parent is said to be a "boundary" simplex, and a simplex with no parents is called a "principal simplex." The dimension of K is the maximum dimension of its simplices (e.g., a two-simplex is a two-dimension simplex). K is "regular" if all its principal simplices have the same dimension, and "irregular" if the principal simplices have different dimensions.

Figure 2A:
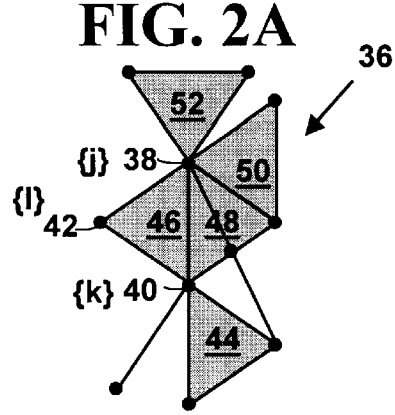
FIGS. 2A–2E are block diagrams illustrating a simplicial complex and selected ones of its subsets.
Figure 2B:
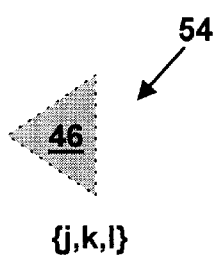
Figure 2C:
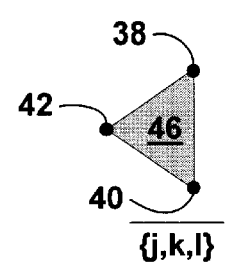
Figure 2D:
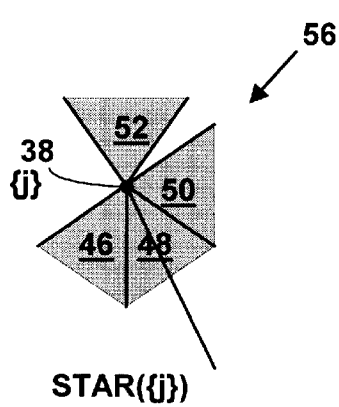
Figure 2E:
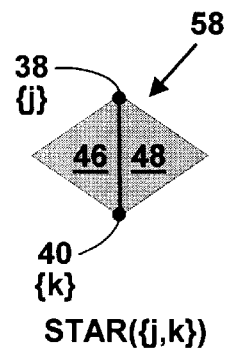

FIGS. 2A–2E are block diagrams illustrating a simplicial complex K 36 and selected ones of its subsets. FIG. 2A is a simplicial complex K 36 with vertices {j}, {k}, {l}, (38, 40, 42) (and other vertices not explicitly labeled) and multiple faces (44, 46, 48, 50, 52). FIG. 2B illustrates a individual simplex 54 {j,k,l} (38, 40, 42) which are related by face 46. FIG. 2C illustrates a face $\overline{\{j,k,l\}}$ 46 of simplex-54 {j,k,l} (38, 40, 42). The faces are three vertices {j}, {k}, {l}, three edges (i.e., 1-simplices) {j, k}, {k, l} {l, j} and a triangle 2-simplex {j, k, l} itself. FIG. 2D illustrates star({j}) 56, the set of simplices of which vertex {j} 38 is a face (46, 48, 50, 52). FIG. 2E illustrates the star of ({j,k}) 58, the set of simplices of which vertices {j} and {k} (38,40) are faces (46,48).

To form a triangulation of a simplicial complex K, vertices { 1, . . . , m} are identified with standard basis vectors {$e_1, \ldots, e_m$} of geometric space $R^m$. For each simplex s, the "open" simplex $<s> \subset R^m$ denotes the interior of a convex hull of its vertices with the formula shown in equation 1.

$$\langle s \rangle = \left\{ b \in R^m : b_j \geq 0, \sum_{j=1}^{m} b_j = 1, b_j > 0 \Leftrightarrow \{j\} \subseteq s \right\} \quad (1)$$

A topological realization |K|, is defined as $|K|=<K>=\cup_{s \in K} <s>$. The geometric realization of K is an image $\phi v(|K|)$ where $\phi v: R^m \rightarrow R^3$ is a linear map that sends the j-th standard basis vector $e_j \in R^m$ to $v_j \in R^3$. A restricted set of vertex positions $V=\{v_1, \ldots v_m\}$ lead to an embedding of $\phi(|K|) \subset R^3$ (i.e., prevents self-intersections). The geometric realization $\phi v(|K|)$ is called the "simplicial complex" or "polyhedron" which is formed by an arbitrary union of points, segments, triangles, tetrahedra, etc. There are multiple triangulations (K, V) for a given polyhedron.

Two sets are said to be "homeomorphic" (denoted as "$\cong$" for simplicity hereinafter) if there exists a continuous one-to-one mapping between them. Equivalently, the two sets are said to have the same "topological type." The topological realization |K| is a d-dimensional manifold without boundary if for vertex {j}, $<star(\{j\})> \cong R^d$. As is known in the art, a manifold is a topological space defined such that every point has a neighborhood which is homeomorphic to the interior of a sphere in Euclidean space of the same number of dimensions. A neighborhood for a manifold is the set of all points whose distances from a given point fall within a pre-determined range.

The topological realization |K| is a d-dimensional manifold if $<star(\{v\})>$ is homeomorphic to either $R^d$ or $R_+^d$ where $R_+^d=\{x \in R^d : x_1 \leq 0\}$. }. Two simplices $s_1$ and $s_2$ are "d-adjacent" if they have a common face. Two simplices $s_1$ and $s_2$ are "manifold-adjacent" if $<star(\{s_1\} \cap \{x_2\}) \cong R^{d+1}$. Transitive closure of zero-adjacency partitions a simplicial complex K into "connected components." Transitive closure of manifold-adjacency partitions a simplicial complex K into "manifold components."

Progressive Meshes

In a progressive mesh representation of a geometric model M, a mesh can be represented as a tuple M=(K, V, D, S) where K is an abstract simplicial complex restricted to define an orientable two-dimensional manifold, vertex positions $V=\{v_1, \ldots, v_m\}$ determine its geometric realization $\phi v(|K|)$ in $R^3$ space, D is the set of discrete material attributes $d_f$ associated with two-simplices $f \in K$, and S is a set of scalar attributes $s_{(v,f)}$ (e.g., normals, texture coordinates, etc.) associated with corners (v,f) of K.

To create a progressive mesh representation for a geometric model, an arbitrary mesh $M^A$ is simplified through a sequence of edge collapse (ecol) operations to yield a much simpler base mesh $M^0$. An illustrative progressive mesh simplification operation using edge collapses known in the art is shown in equation 2.

$$(M^A = M^n) \Rightarrow ecol_{n-1} \Rightarrow \ldots ecol_1 \Rightarrow M^1 ecol_0 \Rightarrow M^0 \quad (2)$$

Figure 3:
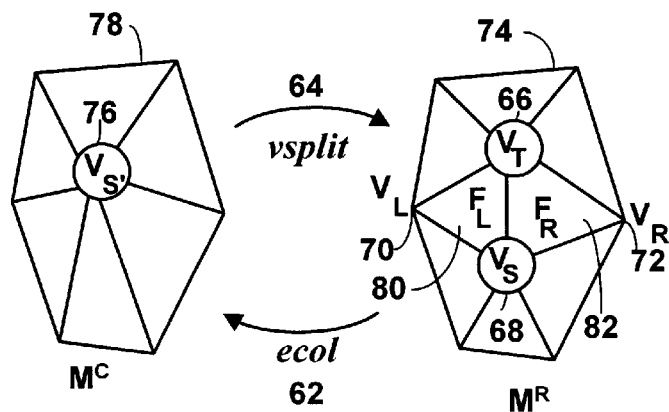
FIG. 3 is a block diagram of prior art vertex split and edge collapse operations for progressive meshes.

FIG. 3 is a block diagram illustrating an edge collapse 62 and a vertex split operation 64 known in the art. Edge collapse operation (ecol) 64, parameterized as ecol($v_S$, $v_L$, $v_R$, $v_T$, $F_L$, $F_R$), unifies 2 adjacent vertices $v_S$ 66 and $v_T$ 68 between two additional vertices $v_L$ 70 and $v_R$ 72 from a refined progressive mesh representation $M^R$ 74 into a single vertex $v_S'$ 76 on a coarser progressive mesh representation $M^C$ 78. Coarser progressive mesh $M^C$ 78 can be a final base mesh $M^0$ or another intermediate coarse mesh $M^C$ (e.g., . . . , $M^2$, $M^1$) in the progressive mesh representation. Vertex $v_T$ 66 and two adjacent faces $F_L$ 80 and $F_R$ 82 as associated with the vertex $v_T$ 66 vanish in the process. A new mesh position is specified for the unified vertex $v_S'$ 76.

Edge collapse operation 62 has an inverse called a vertex split (vsplit) operation 64. An illustrative vertex split operation 64 is shown in equation 3. However, other vertex split operations could also be used.

$$M^0 \Rightarrow vsplit_0 \Rightarrow M^1 vsplit_1 \Rightarrow \ldots vsplit_{n-1} \Rightarrow (M^n = M^A) \quad (3)$$

Arbitrary refined mesh $M^A$ can be any mesh in the progressive mesh sequence (e.g., $M^1$, $M^2$, . . . etc.) shown in equation 3. Each vertex split, parameterized as vsplit ($v_S$, $v_L$, $v_R$, $v_T$, $F_L$, $F_R$), modifies the coarse progressive mesh representation $M^C$ 78 by introducing one new vertex $v_T$ 66 and two new faces $F_L$ 80 and $F_R$ 82. Face $F_L$ 80 is defined by three vertices $F_L=\{v_S, v_L, v_T\}$ (68,70,66). Face $F_R$ 82 is defined by three vertices $f_R=\{v_S, v_R, v_T\}$(68,72,66). The resulting sequence of meshes, $M^0 \ldots M^n = M^A$ is effective for view-independent Level of Detail (LOD) control.

As can be seen in FIG. 3, each edge collapse operation 62 unifies two vertices. Vertex split operation 64 inverts edge collapse transformation 62, so an arbitrary mesh $M^A$ may be represented by a simple mesh $M^0$ together with a sequence of N-vertex split operations. For more information on progressive meshes see "Progressive Meshes," by Hugues Hoppe, *ACM SIGGRAPH'96 Proceedings*, pp. 99–108.

Topological Constraints on Progressive Meshes

The definitions of edge collapse 62 and vertex split 64 preserve the topological type of the mesh (i.e., all |K'| are homeomorphic). However, there is a constraint on the minimum complexity that $K^0$, a coarse simplicial complex may achieve. As is known in the art, the minimal number of vertices g for a closed genus mesh (i.e., an orientable 2-manifold) is $[(7+(48 g+1)^{1/2})/2]$, if $g \neq 2$, and 10 if g=2. That is, the ceiling of seven plus, forty-eight multiplied by g plus 1 raised to the one-half power, divided by two, is the minimal number of vertices g for a closed genus mesh, for g not equal to two, and ten if g is equal to two. For more information, see "Minimal triangulations on orientable surfaces," by M. Jungerman and G. Ringel, *Acta Mathematica* 145, vol. 1–2, 1980, pp. 121–154. The presence of boundary components may further constrain the complexity of $K^0$. If $K^\wedge$, is a triangular simplicial complex, $K^\wedge$ may consist of a number of components that appear in a base mesh $M^0$ in the progressive mesh representation.

Progressive Simplicial Complex Representation

In an illustrative embodiment of the present invention, a geometric model represented by a progressive mesh representation is generalized with a progressive simplicial complex representation. An arbitrary geometric model M is represented with tuple M=(K, V, D, A), with four members K, V, D, A. However, more or fewer tuple members could also be used (e.g., M=(K,V)). Member K is an abstract simplicial complex, member V is vertex positions $V=\{v_1, \ldots, v_m\}$ which determine geometric realization $\phi v(|K|)$ in $R^3$ geometric space, member D is the set of discrete material simplex attributes $d_f$ associated with two-simplices $f \in K$, and member A is a set of areas that associates an area $a_S, \in$ A with principal simplices of dimension zero and one for member K. In an illustrative embodiment of the present invention, a zero-dimension simplex is a vertex, a one-dimension simplex is an edge, a two-dimension simplex is a triangle, etc. A zero-dimension simplex is also called a zero-simplex, one-dimension simplex is also called at one-simplex hereinafter.

In an illustrative embodiment of the present invention, simplicial complex K is not restricted to 2-manifolds, but can be used to represent an arbitrary geometric element. A simplicial complex K is determined by generating an incidence graph of the simplices of K. As is known in the art, an incidence graph on a simplicial complex K is the undirected graph whose nodes are the simplices of K, and whose edges connect any pair of nodes/simplices $\{a\}$ and $\{b\}$ if and only if, either $\{a\}$ is a parent of $\{b\}$, or $\{b\}$ is a parent of $\{a\}$. In an illustrative embodiment of the present invention, an incidence graph is generated using the C++ data structure shown in Table 1. However, other data structures and programming languages could also be used.

TABLE 1

```
struct Simplex {
        int dim; // simplex dimension, 0=vertex, 1=edge, 2=triangle, etc.
        int id; // simplex material attribute identifier d_s
        Simplex* children[MAXDIM+1]; // [0 . . . dim], list of children
        List<Simplex*>parents; // list of parents
};
```

The data structure shown in Table 1 is used to represent simplicial complex K in memory 16 of computer system 10 (FIG. 1).

Progressive Simplicial Complex Creation

Figure 4:
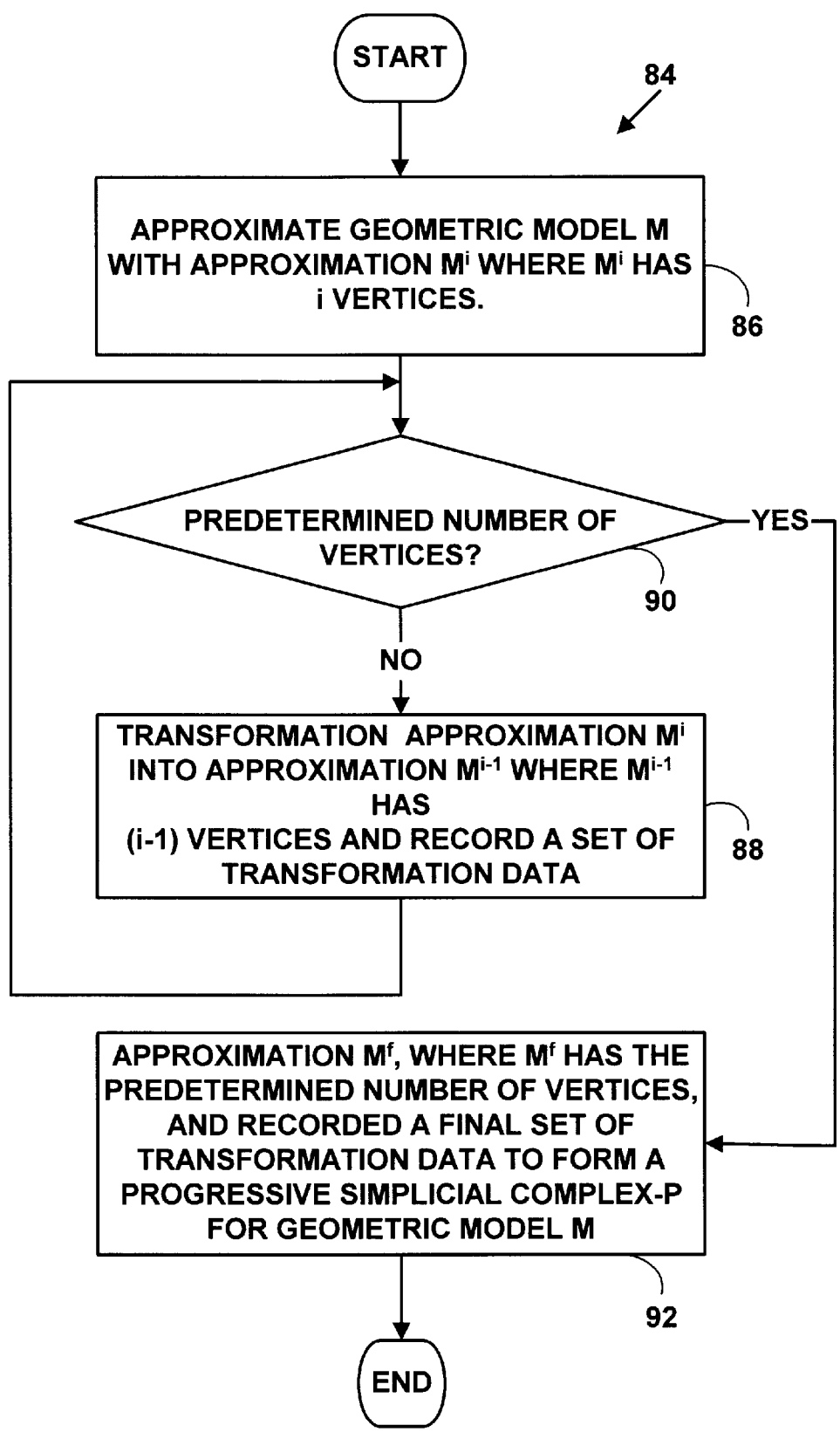
FIG. 4 is a flow diagram illustrating a method for creating progressive simplicial complexes.

To create a progressive simplicial complex P from a progressive mesh representation of a geometric model M=(K, V, D, A), a sequence of approximations are created. However, other geometric models can also be used (e.g., M=(K, V)) as starting point for the sequence of approximations that will create a progressive simplicial complex. FIG. 4 is a flow diagram illustrating a method 84 for creating progressive simplicial complexes. At step 86, a geometric model M is approximated as a first approximation $M^i=(K^i, V^i, D^i, A^i)$ from a representation of M, where $M^i$ has i-vertices. At step 88, the first approximation $M^i$ is transformed with a progressive simplicial complex transformation $t^{i-1}$ to create a second approximation $M^{i-1}$, where the second approximation $M^{i-1}$ has (i-1) vertices. As each progressive simplicial complex transformation is completed, transformation data is recorded which allows the transformation to be inverted at a later time. The progressive simplicial complex transformation transforms one or more the tuple members $K^i$, $V^i$, $D^i$ or $A^i$. The progressive simplicial complex transformations used will be explained below.

A loop at step 90 repeats step 88 until a final approximation $M^f$ is created that has a predetermined number of vertices. In an illustrative embodiment of the present invention, the predetermined number of vertices is one, and the final approximation is $M^f=M^1$. However, other numbers (e.g., 2, 3, 4 etc.) can also be used for the predetermined number of vertices for the final approximation $M^f$.

At step 92, the final approximation $M^f$ and the set of saved transformation data corresponding to transformations $\{t^{i-1}, \ldots, t^1\}$ form a progressive simplicial complex P. That is, in an illustrative embodiment of the present invention, the tuple $(M^1, \{t^1, \ldots, t^{i-1}\})$ forms a progressive simplicial complex representation P of the geometric model M where $M^1=(K^1, V^1, D^1, A^1)$ and $\{t^{1-1}, \ldots, t^i\}$ is the set of progressive simplicial complex transformations. The progressive simplicial complex P can be used to render, compress, and progressively transmit an approximation of the geometric model over a computer network like the Internet or an intranet for computer games and other applications.

Progressive Simplicial Complex Level-of-Detail Sequencing

For a given geometric model $M^n$ in an illustrative embodiment of the present invention, a sequence of approximations are used as is shown in equation 4 where ($1 \leq i \leq n$) to create a progressive simplicial complex P.

$$M^1 \leftrightarrows^{op1} M^2 \leftrightarrows^{op2} \ldots M^{n-1} \leftrightarrows^{op1n-1} M^n \quad (4)$$

The geometric model $M^n$ has n vertices and $op^n$ are n-transformation operations on $M^n$.

The progressive simplicial complex transformation operations $op^n$ include a generalized vertex unification transformation, and a generalized vertex split transformation. However, more or fewer transformations could also be used. The generalized transformation operations are explained below.

Generalized Vertex Unification Transformation for Progressive Simplicial Complexes A generalized vertex unify transformation (vunify) for an illustrative embodiment of the present invention is shown in equation 5. The generalized vertex unify transformation is one of the progressive simplicial complex transformations used in method 86 (FIG. 4) to create a progressive simplicial complex.

$$\text{vunify}_i(\{a_i\}, \{b_i\}, \text{midp}_i): M^i \leftarrow M^{i+1} \quad (5)$$

The vunify transformation takes an arbitrary pair of vertices ($\{a_i\}, \{b_i\}) \in K^{i+1}$ and merges them into a single vertex $\{a_i\} \in K^i$ where $K^i$ is an $i^{th}$ simplicial complex of K. The simplex $\{a_i, b_i\}$ need not be present in $K^{i+1}$. A midpoint $\text{midp}_i$ is Boolean parameter to indicate if the unification of $\{a_i\}$ and $\{b_i\}$ should be at the midpoint of $\{a_i, b_i\}$ in simplicial complex K.

Figure 5:
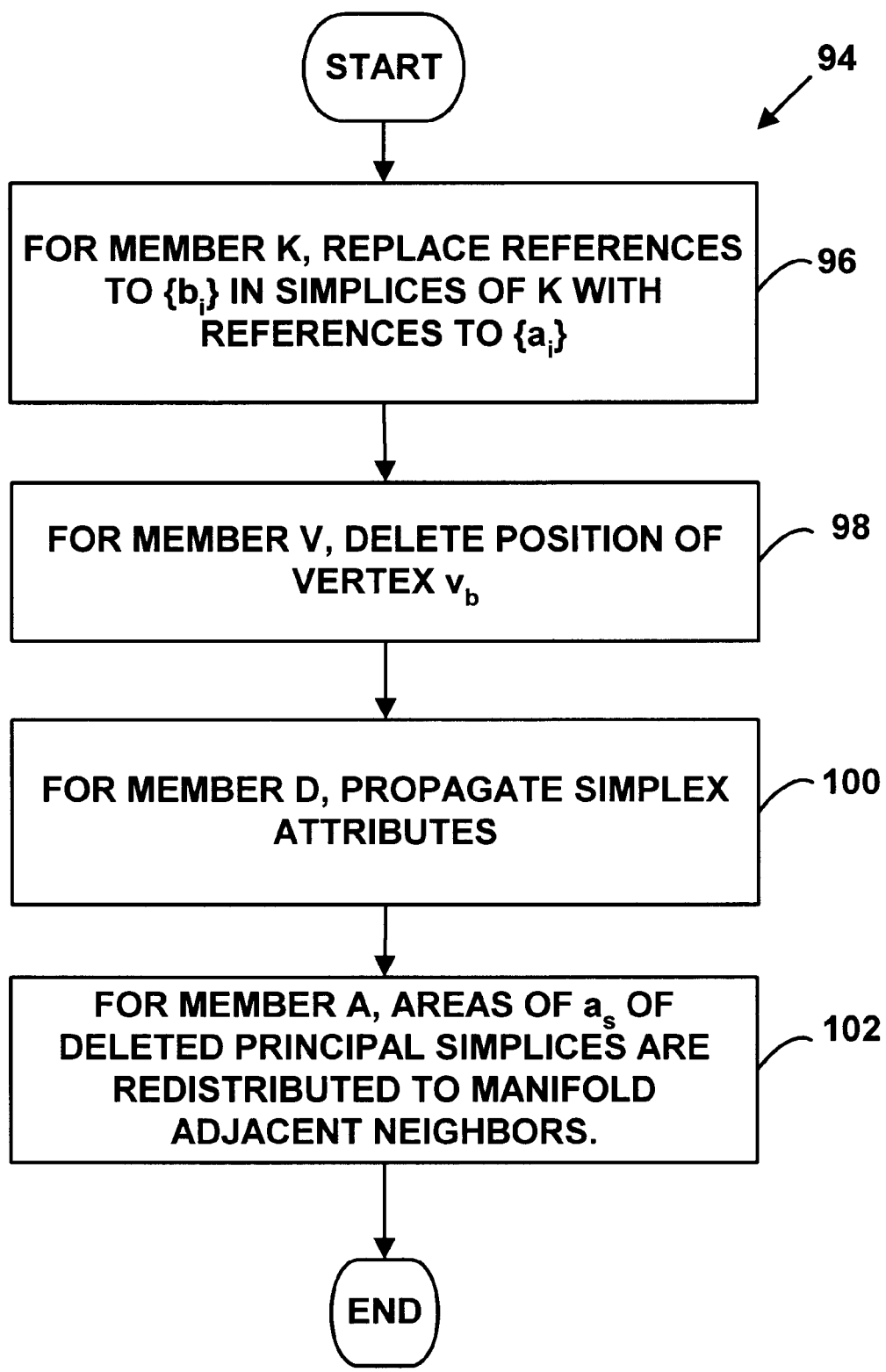
FIG. 5 is a flow diagram illustrating a method for a generalized vertex unification transformation.

FIG. 5 is a flow diagram illustrating a method 94 for the generalized vertex unify transformation shown in equation 5. Approximation $M^i$ is created from approximation $M^{i+1}$ by updating one or more of the numbers of the tuple M=(K, V, D, A) for geometric model M. However, method 94 can also be used on other geometric models (e.g., M=(K,V)). To unify two arbitrary simplex vertices ($\{a_i\}, \{b_i\}$) from simplicial complex K, references to $\{b_i\}$ in simplices of K are replaced by references to $\{a_i\}$ at step 96. That is, a simplex s in star($\{b_i\}$) $\subset K^{i+1}$ is replaced by $(s \setminus \{b_i\}) \cup \{a_i\}$ in $K^i$, which is called the "ancestor" simplex of s. As is known in the art, the '\' symbol is the set difference operator and the symbol '$\cup$' is the set union operator. If this ancestor simplex already exists, s is deleted.

For member V, the position of vertex $v_b$ is deleted at step 98. The position of the remaining unified vertex is set to either the midpoint between $v_b$ and $v_a$ or is left unchanged. That is, $v^i_a=(v^{i+1}_a+v^{i+1}_b)/2$ if the Boolean parameter $\text{midp}_i$ from Equation 5 is true, otherwise $v^i_a=v^{i+1}_a$.

For member D, material simplex attributes for the simplices are propagated along at step 100. After a vertex unification, if an ancestor simplex $(s \setminus \{b_i\}) \cup \{a_i\} \in K^i$ is a new principal simplex, it receives its material simplex attributes from $s \in K^{i+1}$ if s is a principal simplex, or receives material simplex attributes from $s \cup \{a_i\} \in K^{i+1}$ of s if it is not a principal simplex.

For member A, a set of areas as of the deleted principal simplices are redistributed to manifold-adjacent neighbors at step 102. The area of each principal d-simplex-s deleted during the K update of K is distributed to a manifold-adjacent d-simplex not in star($\{a_i\},\{b_i\}$). If no such neighbors exist, and the ancestor of s is a principal simplex, the area as is distributed to the ancestor simplex. Otherwise, the manifold component star($\{a_i\},\{b_i\}$) of s is being compressed between two other manifold components, and area $a_S$ is discarded. In an illustrative embodiment of the present invention each of members of the tuple (K, V, D, A) are changed during a vertex unify transformation 94. In an alternative embodiment of the present invention only selected ones of the tuple (K, V, D, A) are changed (e.g., only K, V). The generalized vertex unify transformation 94 is used in method 84 to create a progressive simplicial complex P.

Generalized Vertex Split Transformation for Progressive Simplicial Complexes

The inverse of the generalized vertex unification transformation 94 shown in equation 5 is a generalized vertex split transformation. A generalized vertex split transformation (gvspl$_i$) is shown in equation 6. The generalized vertex split transformation is one of the progressive simplicial complex transformations which is used in the illustrative embodiment of the present invention.

$$\text{gvspl}_i(\{a_i\}, C_i^{\Delta K}, \text{midp}_i, (\Delta v)_i, C_i^{AD}, C_i^{AA}): M^{i+1} \leftarrow M^i \qquad (6)$$

In equation 6, $\{a_i\}$ is the vertex that will be split, $C_i^{\Delta K}$ is a series of split codes for adding new simplices to simplicial complex $K^i$, midp$_i$ is Boolean parameter indicating if the split of vertex $\{a_i\}$ should be at a midpoint of $\{a_i\}$ and $\{i+1\}$, $(\Delta v)_i$ is the change in vertex positions, $C_i^{AD}$ is a string storing material simplex attributes for new principal simplices, and $C_i^{AA}$ is a string which tracks the changes in areas for new principal simplices.

Figure 6:
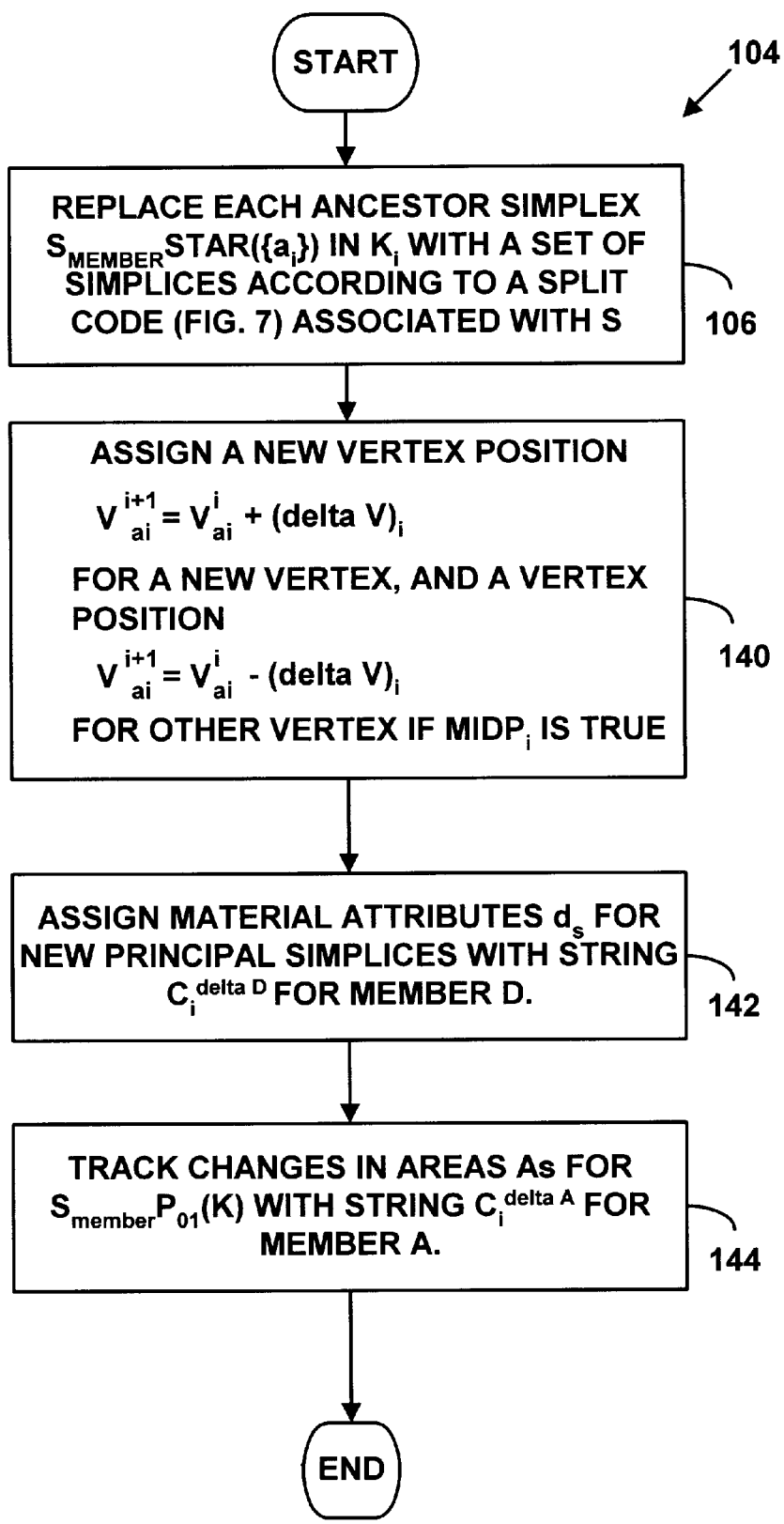
FIG. 6 is a flow diagram illustrating a method for a generalized vertex split transformation.

FIG. 6 is a flow diagram illustrating a method 104 for the generalized vertex split transformation shown in equation 6. Method 104 constructs approximation $M^{i+1}$ from approximation $M^i$ by updating one or more of the members of tuple M=(K, V, D, A). For member K at step 106, each ancestor simplex s ∈ star($\{a_i\}$) in $K^i$ is replaced with a set of simplices as shown in Table 2. However, more or fewer simplices could also be used.

TABLE 2

1. s
2. (s \ $\{a_i\}$) ∪ $\{i+1\}$
3. s and (s \ $\{a_i\}$) ∪ $\{i+1\}$
4. s, (s \ $\{a_i\}$) ∪ $\{i+1\}$ and s ∪ $\{i+1\}$ The replacement at step 106 is determined using a "split code" associated with s. Split codes are a set of numeric codes that determine how a d-dimensional simplex is transformed. Split codes are stored as a code string $C_i^{\Delta K}$, in which the simplices star($\{a_i\}$) are sorted in order of increasing dimension, and then in order of increasing simplex identifiers. However, other orderings could also be used.

Figure 7:
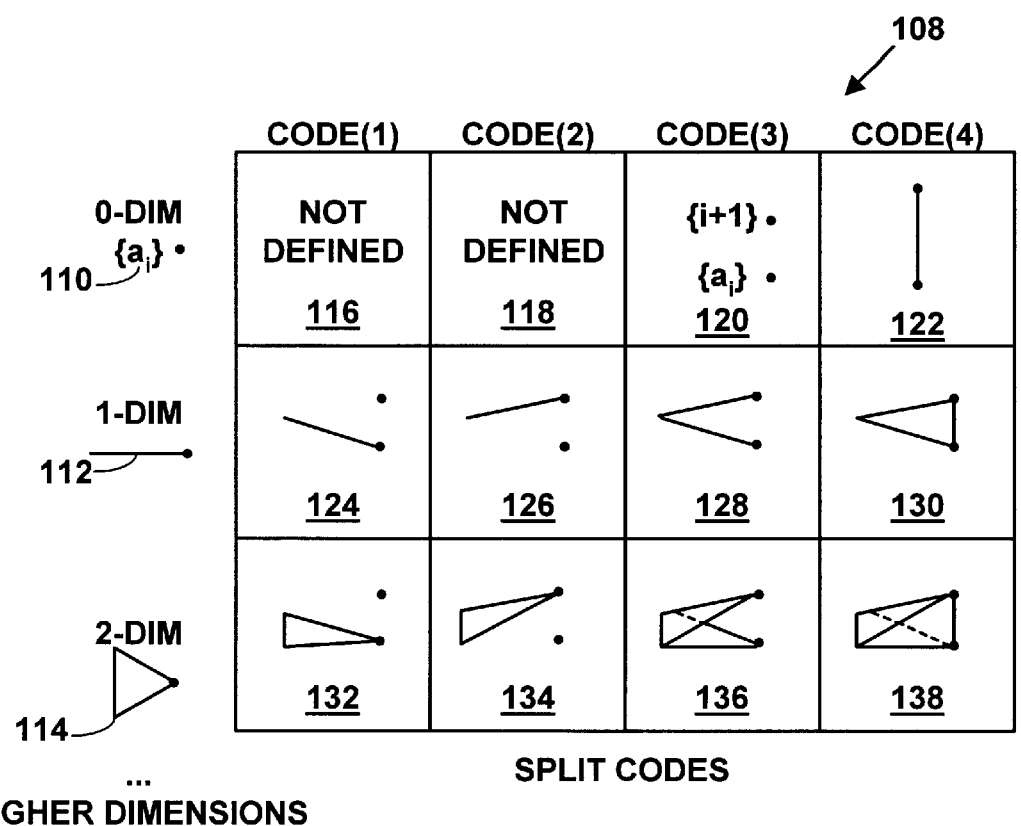
FIG. 7 is a block diagram illustrating the effects of split codes on simplices of various dimensions.

FIG. 7 is a block diagram 108 illustrating the effects of split codes from step 106 on simplices of various dimensions. Simplices of dimension zero (i.e., a vertex) 110, dimension one (i.e., an edge) 112 and dimension two (i.e., a triangle) 114 are illustrated in FIG. 7. However, more or fewer dimensions could also be used and the present invention is not limited to two-dimension split codes.

To construct $K^{i+1}$ at step 106 for a zero-dimensional simplex 110 with a (split code=3 ) 120 (i.e., code (3)), an ancestor simplex s ∈star($\{a_i\}$) in $K^i$ is replaced with "s and (s \$\{a_i\}$)∪$\{i+1\}$"(i.e., entry 3 Table 2) in $K^{i+1}$ which is illustrated in box 120. The lower simplex in box 120 is $\{a_i\}$ and the upper simplex in box 120 is $\{i+1\}$. In each of the boxes in FIG. 7 (i.e., 116, 118, 120, 122, 124, 126, 128, 130, 132, 134, 136, 138 ), the lower vertex is assumed to the simplex $\{a_i\}$ and the upper point is assumed to be the simplex $\{i+1\}$.

As another example, for a one-dimensional simplex s (i.e., an edge) 112, with a (split code=2) 126 (i.e., code (2)), an ancestor simplex s ∈ star($\{a_i\}$) in $K^i$ is replaced with "(s\$\{a_i\}$)∪$\{i+1\}$" (entry 2, Table 2) which is illustrated in box 126. That is, the horizontal line for the one-dimensional simplex which was attached to the lower simplex $\{a_i\}$ in box 124, is now attached to the upper simplex $\{i+1\}$ in box 126. The other codes represent similar operations for other simplices of zero, one, and two dimensions.

Returning to FIG. 6, at step 140, for member V, a new vertex is assigned a position $v_{ai}^{i+1} = v_{ai}^i + (\Delta v)_i$. The other vertex is given position $v_{ai}^{i+1} = v_{ai}^i - (\Delta v)_i$ if the Boolean parameter midp$_i$ is true; otherwise its positions remains unchanged. At step 142 for member D, a string $C_i^{AD}$ is used to assign material simplex attributes $d_s$ for new principal simplices. Simplices in $C_i^{AD}$, as well as in $C_i^{AA}$ are sorted by simplex dimension and simplex identifier in $C_i^{\Delta K}$. At step 144 for member A, changes are tracked in areas $a_s$ for s ∈ $P_{01}(K)$ using the string $C_i^{AA}$ where $P_{01}(K)$ denotes the zero-dimension and one-dimension simplices of simplicial complex K.

Representing Progressive Simplicial Complexes

FIG. 8 is a flow diagram illustrating a method 146 for representing progressive simplicial complexes. A geometric model M is approximated as a first approximation $M^i$ where $M^i$ has i-vertices. At step 148, a sequence of progressive simplicial complex transformations as vertex unify transformation 94 (i.e., equation 5) are completed on $M^i$ which simplify $M^i$ (e.g., $M^{i-1}$, $M^{i-2}$, etc.) down to a single vertex approximation $M^1$. At step 150, the vertex unify sequence created at step 148 is reversed, and the simplices in the approximation sequence $M^i, \ldots, M^1$ are renumbered in the order that they were created so that generalized vertex split transformation 104 (i.e., equation 6) splits vertex a $\{a_i\}$ into two vertices, ($\{a_i\}, \{i+1\}$) ∈ $K^{i-1}$. Since the vertices may have different positions in the different approximations, the position of $\{j\}$ in $M^i$ is denoted as $v^i_j$. To better approximate a model $M^i$ at lower complexity levels, a set of areas $a_s$, equal to its triangle areas are associated with principal two-simplices in the approximation sequence $M^i, \ldots, M^1$. As the model $M^i$ is simplified, a sum of areas $a_s$ associated with principal simplices within manifold components is maintained at a constant value. When two-simplices are reduced to principal one-simplices and principal zero-simplices in the progressive simplicial complex, their associated areas provide good estimates of the original component areas in geometric model M.

Geomorphs for Progressive Simplicial Complexes

For an arbitrary geometric model M (K, V, D, A) there exists a correspondence between approximations $M^1 \ldots M^n$. In an illustrative embodiment of the present invention, given a coarser model $M^c$ and a finer model $M^f$, where 1<=c<f<=n, vertices $\{j\}$ ∈$K^f$ corresponds to a unique vertex ancestor vertex $\{\rho^{f \to c}(j)\}$ ∈ $K^c$ found by recursively traversing the ancestor simplex relations shown in equation 7.

$$\rho^{f \to c}(j) = \{j, j \le c, \rho^{f \to c}(a_j - 1), j > c\} \qquad (7)$$

This correspondence allows the creation of a smooth visual transition "geomorph" $M^G(\alpha)$ such that $M^G(1)$ looks like $M^f$ and $M^G(0)$ looks like $M^c$. The geomorph is defined with the simplex model tuple shown in equation 8.

$$M^G(\alpha) = (K^f, V^G(\alpha), D^f, A^G(\alpha)) \quad (8)$$

FIG. 9 is a flow diagram illustrating a method 156 for creating a geomorph for a progressive simplicial complex. To create a geomorph with equation 8, vertex positions in a simplex $K^f$ are interpolated between an original position in $V^f$ and a position of an ancestor in $V^c$ at step 158 as is shown in equation 9.

$$v_j^G(\alpha) = (\alpha)v_j^f + (1-\alpha)v_{pf \to c(j)} \quad (9)$$

In an illustrative embodiment of the present invention, rendering of principal simplices of all principal simplices are completed. Principal simplices of dimension-two (i.e., triangles) are rendered as triangle For simplices $s \in P_{01}(K^f)$ (dimension-zero and dimension-one simplices) an interpolation of a simplex area $a_s^G(\alpha)$ is completed using equation 10.

$$a_s^G(\alpha) = (\alpha)a_s^f + (1-\alpha)a_s^c \quad (10)$$

where $a_s^c = 0$ if $s \notin P_{01}(K^c)$. That is, at steps 160 and 162 a first and second set of areas are interpolated using equation 10 for simplices of dimension-zero and dimension-one $P_0(K^f)$ respectively for $K^f$. The first and second set of areas account for areas of a simplex between the fine model $M^f$ (e.g., $(\alpha)a_s^f$) and the coarse model $M^c$ (e.g., $(1-\alpha)a_s^c$). In addition, at steps 164 and 166 a third and fourth set of areas for simplices $s \in P_{01}(K^c) \backslash P_{01}(K^f)$ of dimension-zero and dimension-one are rendered using area $a_s^G(\alpha)$ shown in equation 11, where '\' is the set difference operator.

$$a_s^G(\alpha) = (1-\alpha)a_s^c \quad (11)$$

The third and fourth areas take account for areas of simplices of dimension-zero and dimension-one from the coarse model $M^c$. The set of vertex positions, and the first, second, third, and fourth set of areas are used to render the geomorph $M^G$ from equation 8 at step 168. The resulting geomorph is visually smooth even as principal simplices are introduced, removed, or change dimension in the progressive simplicial complex.

Progressive Simplicial Complex Compression

The progressive simplicial complex created with method 146 offers a concise representation of a geometric model M. Using arithmetic coding techniques known in the art, a vertex identifier field for a vertex $\{a_i\}$ (Table 1) requires $\log_2 i$ bits on the average, and the Boolean parameter midp$_i$ (Equations 5 and 6 described above) requires 0.6–0.9 bits on the average. The delta vector $(\Delta v)_i$ (Equation 6) is quantized to 16 bits per coordinate on the average (i.e., 48 bits per $\Delta v$) and is stored as a variable length field requiring 31 bits on average. For more information on use of a variable length field see "Geometry of Compression" by M. Deering, ACM SIGGRAPH'95, pp. 13–20. Compression is important when the progressive simplicial complex is used for a computer application such as an interactive computer game over a computer network like the Internet, or an intranet. Compression on progressive simplicial complexes can be completed in connection with the generalized vertex split transformation shown 104 in equation 6 in an illustrative embodiment of the present invention.

Split codes (FIG. 7) stored in the string $C_i^{\Delta K}$ from equation 6 are constrained by other split codes in an illustrative embodiment of the present invention. FIGS. 10A–10C are block diagrams illustrating slit code encoding with constraints. Example codes used for split code encoding are illustrated in FIG. 7. FIG. 10A is a block diagram which illustrates the simplices in the star of vertex 172 within a simplicial complex K 170. FIG. 10A illustrates a single zero-dimension-simplex ($1^0$) 172, five one-dimension-simplices($1^1, 2^1, 3^1, 4^1, 5^1$) 174, 176, 178, 180, 182, and two two-dimension-simplices ($1^2, 2^2$) 184, 186. FIG. 10B is a block diagram 188 of a code string $C_i^{\Delta K}$ for the zero-dimension simplices 190, the one-dimension-simplices 192 and the two-dimension-simplices 194 from the simplicial complex K 170 in FIG. 10A. A code(1) 124 (FIG. 7) for 1-simplex identifier $1^1$174 (FIG. 10A) implies that 2-simplex-identifier $1^2$ 184 (FIG. 10A) also has a code(1) 132 (FIG. 7) (i.e., both include $\{a_i\}$. This in turn implies that 1-simplex-identifier $2^1$ 176 cannot have a code (2) 126. Similarly, a code(2) 126 for 1-simplex-identifier $3^1$ 178 implies a code(2) 134 for 2-simplex-identifier $2^2$ 186 (i.e., both include $\{i+1\}$) and that 1-simplex-identifier $4^1$ 180 cannot have a code(1) 124. The code string 196 stores the split codes (i.e., code(x), 116–138 from FIG. 7) for the simplicial complex K 170.

The constraints for split codes for the string $C_i^{\Delta D}$ are summarized by the rules shown in Table 3.

TABLE 3

1. If a simplex has split code c ∈ {1,2} (FIG. 7), all of its parents have split code c.
2. If a simplex has split code 3 (FIG. 7), none of its parents have split code 4.

However, more or fewer constraints can also be used. Split codes for string $C_i^{\Delta D}$ are encoded left to right, and the rules in Table 3 and their contrapositives are applied transitively to constrain the possible outcomes for codes yet to be encoded. Using arithmetic coding with uniform outcome probabilities, the constraints in Table 3 reduce the code string 196 length from 30 bits to 14 bits on average.

FIG. 10C is a block diagram 198 illustrating selected ones of the constraints shown in Table 3. Each of the circles around the numbers in 198 represent values from code string 196. For example, the number 3 is circled in the leftmost column of 198 and this corresponds to the leftmost 3 (120) in code string 196. Applying constraint 1 from Table 3, split code(1) for 1-simplex identifier $1^1$ implies that 2-simplex-identifier 12, which is the parent of 1-simplex identifier $1^1$, also has split code(1) i.e., both include $\{a_i\}$ as is illustrated by line 200 (see FIG. 7, boxes 124, 132). This in turn implies that 1-simplex-identifier $2^1$ cannot have split code(2) as is illustrated by line 202 and the "X" over 1-simplex-identifier $2^1$. As can be seen from box 126 in FIG. 7, split code(2) 126 is used with vertex $\{i+1\}$ (upper) instead of vertex $\{a_i\}$ (lower) while code(1) 124 is used with vertex $\{a_i\}$ (lower) instead of vertex $\{i+1\}$ (upper). Lines 204, 206 illustrate constraint 1 from Table 3 when c=2.

The second constraint from Table 3 is also illustrated in FIG. 10C. Zero-simplex identifier $1^0$ 172 has a split code(3) 120. None of the parents of zero-simplex identifier $1^0$ 172 can have a split code(4) 132 as is illustrated by the "X" 208 over the number four in the lower right hand corner of 198 (FIG. 10C).

Code string 196 (FIG. 10B) can be further reduced using non-uniform probability models known in the art. A data structure array T[0 . . . dim][0 . . . 15 ] of encoding tables used in an illustrative embodiment of the present invention, is indexed by simplex dimension [0 . . . dim] and by set a set of possible constrained split codes using a 4-bit mask codes_mask (i.e., $2^4 = 16$). In an illustrative embodiment of the present invention the 4-bit mask is the pattern of the X's in each column of 198. For a set of simplices s, the split code c of s is encoded using a probability distribution found in T[s.dim][s.codes_mask]. For two-dimensional models, only 10 of the 48 tables are non-trivial, and the 10 tables contain at the most four probabilities, so the total size of the probability model is small. The encoding tables reduce the code strings to approximately 8 bits on the average.

FIG. 11 is a flow diagram illustrating a method 210 for compressing a progressive simplicial complex P. To compress $C_i^{\Delta K}$ (Equation 6) the split codes for simplicial complex $K^i$, the split codes are encoded using a set of constraints (e.g., Table 3) at step 212 to create a new set of simplices where $K^i$ is the $i^{th}$ approximation of simplicial complex K. The constraints reduce the amount of bits needed to save the split codes as was described above. In an illustrative embodiment of the present invention, the constraints include those shown in Table 3. However, more or fewer constraints could also be used.

To compress $C_i^{\Delta D}$, the string used to assign attribute materials $d_s$ for new principal simplices, the material simplex attributes for a new principal simplices $s \in \text{star}(\{a_i\}) \cup \text{star}(\{b_i\}) \subset K^{i+1}$ are predicted by constructing an ordered set of material simplex attributes $D_s$ found in $\text{star}(\{a_i\}) \subset K^i$ at step 214. To improve the encoding model in an illustrative embodiment of the present invention, the first simplex material attributes in $D_s$ are those of principal simplices in star(s') $\subset K^i$ where s' is the ancestor of s. The remaining material attributes in $\text{star}(\{a_i\}) \subset K^i$ are appended to the end of $D_s$. Entries in $C_i^{\Delta D}$ associated with s is an index of the material attributes of s in $D_s$ encoded arithmetically If the material attributes of s' are not present in $D_s$, they are specified explicitly as a global index in D.

$C_i^{\Delta A}$. the string used to track the changes in areas $a_s$, is encoded by specifying an area $a_s$ for new principal simplices $s \in P_{01}(\text{star}(\{a_i\}) \cup \text{star}(\{b_i\})) \subset K^{i+1}$ at step 216. To identify the principal simplex from which s receives the area, an index in $P_{01}$ $(\text{star}(\{a_i\}) \subset K^i$ is specified.

In an illustrative embodiment of the present invention, the progressive simplices complex representation used to capture the connectivity of an average 2-manifold simplicial complex with compression method 210 requires $n(\log_2 n+8)$ bits on the average while traditional incidence graph representations known in the art requires at least $n(12\log_2 n+9.5)$ bits on the average. For improved compression in an illustrative embodiment of the present invention, a hybrid compression scheme is used which includes method 210 and a compression scheme for progressive meshes from the "*Progressive Meshes*" paper cited above. However, other hybrid compression schemes could also be used.

Progressive Simplicial Complex Construction

FIG. 12 is a flow diagram illustrating a method 218 for iteratively choosing pairs of vertices to unify in order to construct a progressive simplicial complex. At step 220, vertex unify transformation 94 costs ΔE are calculated for candidate pairs of vertices. At step 222, the vertex unify transformation costs 94 are placed in a priority queue sorted in order of ascending cost. However, other priority queue ordering could also be used. At step 224, a loop is used for $i=n-1,\ldots,1$ to iterate through a set of candidate vertex pairs for model M. At step 226, generalized vertex unify transformation 94 is performed on a pair of vertices using the first item in the priority queue. At step 228, the priority queue is updated to reflect the vertex unify transformation costs of affected vertex pair candidates.

Forming a set of Candidate Vertex Pairs

In principal, all possible pairs of vertices from geometric model M could be entered into the priority queue created at step 222 in FIG. 12. However, this would be very expensive in terms of computation time since a simplification would require at least $O(n^2\log_n)$ time on the average. As is known in the art O(f(n)), notation is used to express the asymptotic complexity of the growth rate of a function f(n).

In an illustrative embodiment of the present invention, a smaller subset C from the full set of candidate vertex pairs from geometric model with M is created. Delaunay triangulation of the vertices of M, represented as a three-dimensional simplicial complex $K_{DT}$ is used to form the subset C of candidate vertex pairs that will be placed in the priority queue at step 222. However, other triangulation methods can also be used.

As is known in the art, Delaunay triangulation is a straight-line dual graph of a set of adjacent points in a Euclidean plane. To form a Delaunay triangulation of a vertices in a simplicial complex K, vertices $\{1,\ldots,m\}$ are identified with standard basis vectors $\{e_1,\ldots,e_m\}$ from geometric space $$R^m \Rightarrow R^3,$$

where $R^3$ is a linear map. Delaunay triangulation can be generalized to higher dimensions. A Voronoi diagram of a set of points P in Euclidean space of any dimension is a set of regions, each region consisting of the set of points closer to a point in P than to any other point in P. The straight-face dual graph of the Voronoi diagram is a Delaunay triangulation. For more information on Delaunay triangulations see "Three-Dimensional Alpha Shapes" by Herbert Edelsbrunner and P. Ernst, *Proceedings of the* 1992 *Workshop on Volume Visualization*, 1992, pp. 75–82 and "Algorithms in Combinatorial Geometry" by Herbert Edelsbrunner, *Springer-Verlag*, 1987.

Subset C contains both the one-simplices of K and the subset of 1-simplices of $K_{DT}$ that connect vertices in different connected components of $K_{DT}$. During the simplification process, generalized vertex unifications 94 are performed on M to form C to keep the set of candidate pairs consistent. For models in $R^3$ geometric space, C $\cap$ star($\{a_i\}$) has constant size in the average case, and the overall simplification algorithm requires $O(n\log_n)$ time on the average. In the worse case it could require $O(n^2\log_n)$ time on the average.

Selecting Vertex Unifications from a Subset of Candidate Vertex Pairs

Vertex pairs from the subset C which are candidates for vertex unification transformations at step 226 are determined. For vertex candidates $(a_i,b_i) \in C$, the associated generalized vertex unify transformation 94 ($\{a_i\}, \{b_i\}$) : $M^i \leftarrow M^{i+1}$ is assigned the cost shown in equation 12 at step 220 (FIG. 12).

$$\Delta E = \Delta E_{dist} + \Delta E_{disc} + E_{\Delta area} + E_{hold} \quad (12)$$

The first term, $\Delta E_{dist} = E_{dist}(M^i) - E_{dist}(M^{i+1})$, where $E_{dist}(M)$ measures the geometric accuracy of the approximate model M. Conceptually $\Delta E_{dist}$ approximates the continuous integral shown in Equation 13.

$$\int_{p \in M} d^2(p, M) \quad (13)$$

In equation 13, d(p, M) is the Euclidean distance of point p to the closest point on geometric model M. The integral in Equation 13 is discretized by defining $E_{dist}(M)$ as the sum of the squared distances to M from a dense (i.e., closely related) set of points X sampled from the original model M. The X points are sampled from a set of principal simplices in K which is used to generalize arbitrary models.

As is known in the art, $E_{disc}$ (M) measures the geometric accuracy of discontinuity curves formed by a set of sharp edges in the progressive mesh representation. In an illustrative embodiment of the present invention, the concept of sharp edges is generalized to sharp simplices in K. A simplex is sharp either if it is a "boundary simplex," or if two of its parents are principal simplices with different material simple attributes.

The energy $\Delta E_{disc}$ from equation 12 is defined as the sum of squared distances from a set $X_{disc}$ of points sampled from sharp simplices to the discontinuity components from which they are sampled. Minimization of $\Delta E_{disc}$ preserves the geometry of material boundaries, normal discontinuities (creases), and triangulation boundaries (including boundary curves of a surface and endpoints of curve).

The term $\Delta E_{area}$ in equation 12 is used to penalize surface stretching of the geometric model. If $A_N^{i+1}$ is a sum of triangle areas in the neighborhood star $(\{a_i\}) \cup star(\{b_i\}) \subset K^{i+1}$, and $A_N^i$ the sum of triangle areas in N=star($\{a_i\}) \subset K^{i+1}$. The mean squared displacement over the neighborhood N due to the change in area can be approximated as shown in Equation 14.

$$disp^2 = 1/2\left(\sqrt{A_N^{i+1}} - \sqrt{A_N^i}\right)^2 \qquad (14)$$

The term $\Delta E_{area}$ which is equal to $|X_N|disp^2$, where $|X_N|$ is the number of points X projecting in the neighborhood N.

To prevent model self-intersections, the last term $E_{fold}$ penalizes surface folding. The rotation of oriented triangles in the neighborhood due to vertex unification is computed. If a rotation exceeds a threshold value, $E_{fold}$ is set to a large constant value. $\Delta E$ in Equation 12 is not optimized over a vertex position $v^i{}_a$. In an illustrative embodiment of the present invention, $\Delta E_{fold}$ is evaluated using Equation 15 and the best vertex position is chosen.

$$v^i{}_a \in \{v^{i+1}{}_a, v^{i+1}{}_b, (v^{i+1}{}_a + v^{i+1}{}_b)/2\} \qquad (15)$$

The use of equation 15 speeds up optimization, improve model compression, and allows for the introduction of non-quadratic energy terms like $\Delta E_{area}$.

Rendering Progressive Simplicial Complexes

Figure 13A:
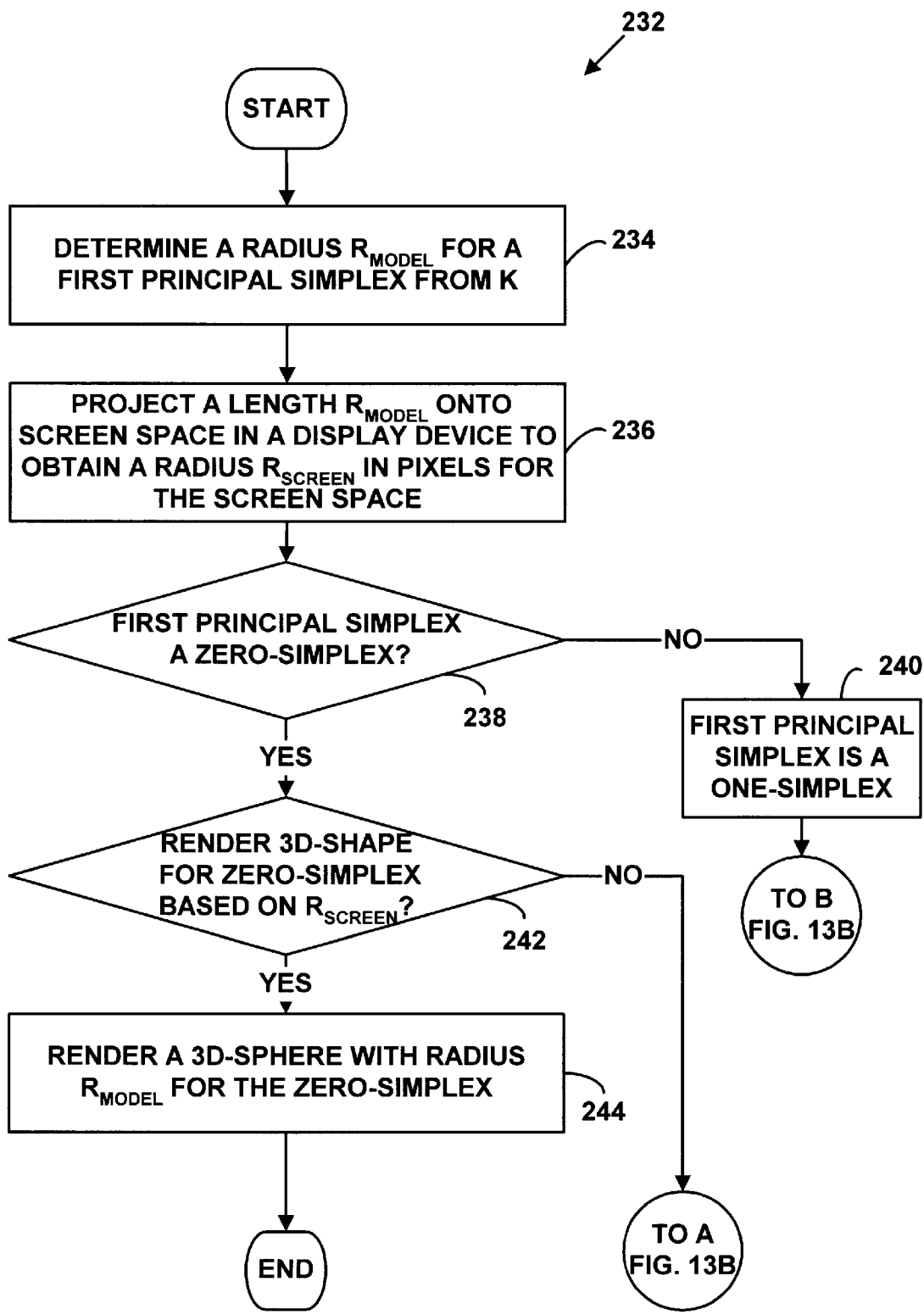
FIGS. 13A and 13B are a flow diagram illustrating a method for rendering progressive simplicial complexes.
Figure 13B:
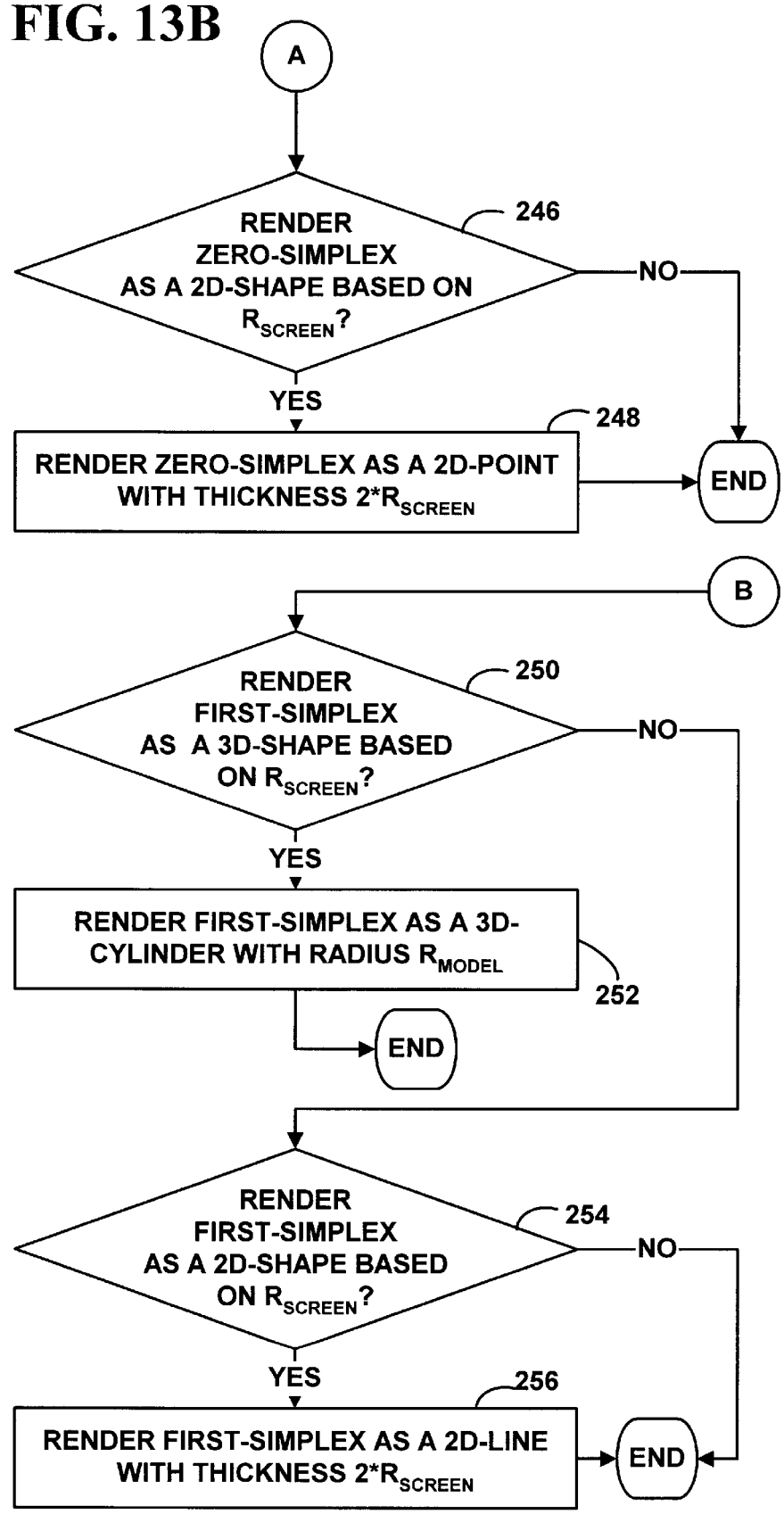

FIGS. 13A–13B are a flow diagram illustrating a method 232 for rendering progressive simplicial complexes P.

Vertex unification schemes known in the art render principal simplices of the union of dimension-zero and dimension-one of the simplicial complex K, denoted $P_{01}(K)$, as points and lines respectively with fixed, device-dependent screen widths. To better approximate an arbitrary model in an illustrative embodiment of the present invention, a set (from $M^i=(K^i, V^i, D^i, A^i)$) is defined that associates an area $a_s \in A$ with zero and one simplices $s \in P_{01}(K)$. A zero-simplex $s_0 \in P_{01}(K)$ approximates a sphere with area $a_{s0}$ and a one-simplex $s_1=\{j,k\} \in P_1(K)$ approximates a cylinder with axis $v_j, v_k$, of area $a_{s1}$ in an illustrative embodiment of the present invention. However, other shapes could also be used for the zero and one simplices, and higher dimensional simplices could also be used.

Returning to FIG. 13A, at step 234, a first bounding element as a radius $r_{model}$ is found by determining a first principal simplex (e.g., $s \in P_{01}(K)$) for the arbitrary geometric model M of a corresponding sphere $s_0 \in P_0(K)$, or cylinder $s_1=\{j,k\} \in P_{01}(K)$ in modeling space for M using its area in A. A length $r_{model}$ is projected onto screen space for a display device (e.g., display 20) to obtain a seconding bounding element as a radius $r_{screen}$ in pixels for the screen space at step 236. A test is conducted at step 238 to determine if the first principal simplex is a zero-simplex, $s_0 \in P_0(K)$. If the first principal simplex is not a zero-simplex $s_0 \in P_0(K)$, then it is for a one-simplex, $s_1=\{j,k\} \in P_1(K)$ at step 240. In an alternative embodiment of this invention, the test at step 238 is expanded to include a test for higher dimension simplices.

If the first principal simplex is a zero-simplex $s_0 \in P_0(K)$, then a test is conducted at step 242 to determine if a three-dimensional polygonal shape (e.g., a sphere) with radius $r_{model}$ should be rendered for the zero-simplex, $s_0 \in P_0(K)$, and if so, a sphere with radius $r_{model}$ is rendered at step 244. If the three-dimensional polygonal shape with radius $r_{model}$ is not rendered at step 242, a test is conducted at step 246 (FIG. 13B) to determine if a two-dimensional shape (e.g., a point) with a radius $r_{screen}$ should be rendered for the zero-simplex, $s_0 \in P_0(K)$, and if so, a two-dimensional point with a thickness of)$(2^* r_{screen})$ is rendered at step 248. However, other thickness could also be used for the two-dimensional point. If the zero-simplex, $s_0 \in P_0(K)$ is not rendered as a two-dimensional point at step 246, then it is not rendered at all.

If the first principal simplex is a one-simplex, $s_1=\{j,k\} \in P_1(K)$ (step 240 FIG. 13A), then a test is conducted at step 250 (FIG. 13B) to determine if a three-dimensional polygonal shape (e.g., a cylinder) with radius $r_{model}$ should be rendered for one-simplex, $s_1= \in P_1(K)$ and if so, a cylinder radius $r_{model}$ is rendered at step 252. If the three-dimensional polygonal shape with radius $r_{model}$ is not rendered at step 252, a test is conducted at step 254 to determine if a two-dimensional shape (e.g., a line) for one-simplex, $s_1=\{j,k\} \in P_1(K)$ with a radius $r_{screen}$ should be rendered for the first principal simplex, and if so, a two-dimensional line with a thickness of $(2^* r_{screen})$ is rendered at step 256. However, other thicknesses could also be used for the two-dimensional shape. If the one-simplex, $s_1=\{j,k\} \in P_1(K)$ is not rendered as a two-dimensional line at step 254, then it is not rendered at all.

To render the geometric model M at steps 244, 248, 252, 256 the principal simplices of simplicial complex K, denoted P(K) are drawn on display device 20 (FIG. 1). Discrete attributes D associate a material identifier $d_s$ with each simplex $s \in P(K)$. As is known in the art, no surface normals are stored at "corners" for the principal simplices of K.

An illustrative Implementation of the Present Invention

In an illustrative embodiment of the present invention, an Indigo 2 Extreme computer system (150 MHz R4400 with 128 MB of memory) by Silicon Graphics of Mountain View, California is used to execute the progressive simplicial complex methods described above. However, other graphics systems could also be used and the present invention is not limited to the Silicon Graphics computer system. The methods described above are implemented as computer software applications in the memory of the Indigo 2 Extreme computer system as C++ applications. However, the methods described above can also be implemented in hardware components, a combination of hardware and software components, and with other programming languages.

The methods used for creating a progressive simplicial complex allows any arbitrary model M (e.g., a model of any dimension, non-orientable, non-manifold, mixed dimensionality) to be expressed as a progressive simplicial complex. Thus, both geometric and topological complexity can be recovered progressively using the progressive simplicial complex.

Additional Graphical Illustrations of the Present Invention

FIGS. 14A–14F are block diagrams of color screen shots (260, 262, 264, 266, 268, 270) illustrating the graphical aspects of the progressive simplicial complexes methods described above for rendering a sequence of approximation, $M^1, \ldots, M^n$ for a progressive simplicial complex for an arbitrary geometric model $M^n$ representing a graphical destroyer. FIG. 14A is a color screen shot 260 of base (final) approximation $M^1$ with principal simplices {1, 0, 0 } and one connected component represented by the red sphere. The triple numbers indicate the number of principal zero-simplices in K, the number of one-simplices in K, and the number of two-simplices in K. FIG. 14B is a color screen shot 262 of an approximation $M^{50}$ with principal simplices {14, 3, 63} (i.e., 14 principal zero-simplices, 3 principal one-simplices, and 63 principal two-simplices) and 18 connected components FIG. 14C is a color screen shot 264 of an approximation $M^{200}$ with principal simplices {20, 9, 253} and 39 connected components. FIG. 14D is a color screen shot 266 of an approximation $M^{1000}$ with principal simplices {5, 89, 1513} and 56 connected components. FIG. 14D is a color screen shot 266 of an approximation $M^{4000}$ with principal simplices {0, 44, 7,333} and 93 connected components. FIG. 14E is a color screen shot 268 of the original model $M^n$ where M=83,799 with principal simplices {0, 0, 167,743} and 117 connected components. All geometric and topological information in FIGS. 14A–14F are encoded progressively in a progressive simplicial complex as was described above.

FIGS. 15A–15C are color block diagrams of color screen shoots (272, 274, 276) of a graphical model of a destroyer stored as a progressive mesh representation known in the prior art without progressive simplicial complexes.

FIG. 15A is a color shot 272 of a final progressive mesh representation $M^0$ of the destroyer. Note the complexity, (1,154 vertices and 2,522 triangles) compared to the base approximation the progressive simplicial complex $M^1$ 260 (one vertex, zero triangles) in FIG. 14A. Since all approximations $M^i$ in the prior art progressive mesh representation must have the same topological type, a base mesh $M^0$ may still be complex (e.g., thousands of vertices, and thousands of triangles) compared to the base approximation $M^1$ for a progressive simplicial complex (one vertex, zero triangles).

FIG. 15B is a color screen shot 274 of a progressive mesh representation $M^{2738}$ with 3,893 vertices and 8000 triangles. Note how the color image in FIG. 14B 264 for progressive simplicial complex approximations $M^{4000}$ with only 93 connected components is a noticeably better approximation of the original graphical destroyer than the 8000 triangle progressive mesh approximation 274 shown in FIG. 15B. FIG. 15C is a color screen shot 276 of the original graphical model $M^n$, where n=82,645 with 83,799 vertices and 167,744 triangles.

To further illustrate the graphical aspects of the present invention, sequences of color block diagrams are shown in FIGS. 16 and 17. FIGS. 16A–16F are color block diagrams illustrating a progressive simplicial complex for a model of a graphical "drum set." FIG. 16A is a color screen display 278 of a progressive simplicial complexes for a base (final) approximation $M^1$ with one vertex, principal simplices {1, 0, 0} and one connected component illustrated by a black sphere. FIG. 16B is a color screen display 280 for approximation $M^{10}$ with principal simplices {5, 1,1 } and 7 connected components. FIG. 16C is a color screen display 282 for approximation $M^{50}$ with principal simplices {4, 6, 56 } and 12 connected components. FIG. 16D is a color screen display 284 for approximation $M^{200}$ with principal simplices {15, 52, 277 } and 28 connected components. FIG. 16E is a color screen display 286 for approximation $M^{500}$ with principal simplices {39, 68, 690 } and 58 connected components. FIG. 16F is a color screen display 288 for approximation $M^{2000}$ with principal simplices {14, 25, 3219 } and 108 connected components. FIG. 16F is already a good approximation and accurately illustrates the original graphical drum set (not shown in FIG. 16) with $M^{n=34,794}$ with 207 connected componets.

FIGS. 17A–17F are color block diagrams illustrating an approximation of progressive simplicial complex for various original graphical models. FIG. 17A is a color screen display 292 of a graphical model for a chandelier with 72, 346 triangles and 276 connected components. FIG. 17B is a color screen display 294 of a progressive simplicial complex approximation $M^{500}$ of the chandelier 292 with principal simplices {3, 52, 674 } and 50 connected components. FIG. 17C is a color screen display 296 of a graphical model for a sailing ship with 232,974 triangles and 2,154 components. FIG. 17D is a color screen display 298 of a progressive simplicial complex approximation $M^{3000}$ of the sailing ship 296 with principal simplices {239, 495, 3189 } and 587 connected components. FIG. 17E is a color screen display 300 of a graphical model for a sandal with 8, 936 triangles and 9 connected components. FIG. 17F is a color screen display 302 of a progressive simplicial complex approximation $M^{100}$ of the sandal 300 with principal simplices {0, 0, 100 } and 2 connected components. The progressive simplicial complex approximation from the illustrative embodiment of the present invention used to create the screen displays shown in FIGS. 17B, 17D, and 17F provide good approximations of the original graphical models with a relatively small number of principal simplexes and connected segments.

It should be understood that the programs, processes, and methods described herein are not related or limited to any particular type of computer apparatus (hardware or software), unless indicated otherwise. Various types of general purpose or specialized computer apparatus may be used with or perform operations in accordance with the teachings described herein. For example, the steps of the flow diagrams may be taken in sequences other than those described, and the claims should not be read as limited to the described order unless stated to that effect.

In view of the wide variety of embodiments to which the principles of my invention can be applied, it should be understood that the illustrated embodiments are exemplary only, and should not be taken as limiting the scope of our invention. Rather, we claim as our invention all such embodiments as come within the scope and spirit of the following claims and equivalents thereto:

We claim:

1. A computer-executed method for creating a progressive simplicial complex P of a geometric model M, wherein geometric model M comprises a tuple (K, V) where tuple member K is a simplicial complex, and a tuple member V is a set of vertex positions that determine the geometric realization of K, the method comprising the following steps:

(a) transforming a first approximation $M^i$ of geometric model M with a progressive simplicial complex transformation to create a second approximation $M^{i-1}$, wherein the first approximation $M^i$ has i-vertices, the second approximation $M^{i-1}$ has i–1 vertices, and the progressive simplicial complex transformation transforms one or more of tuple members $K^i$ or $V^i$;

(b) recording an intermediate set of transformation data associated with the progressive simplicial complex transformation; and (c) repeating steps (a) and (b) until a final approximation $M^f$ is created, wherein the final approximation $M^f$ has a predetermined number of vertices and a final set of transformation data, thereby creating a progressive simplicial complex P that approximates geometric model M.

2. A computer-readable storage medium having stored therein instructions for causing a computer to execute the steps of claim 1.

3. The method of claim 1 wherein the predetermined number of vertices for the final approximation $M^f$ is one.

4. The method of claim 1 further comprising:
transforming the final approximation $M^f$ back into the first approximation $M^i$ with a second progressive simplicial complex transformation using the final set of transformation data.

5. The method of claim 1 wherein the geometric model comprises additional tuple members (D,A) where tuple member D is a set of simplex attributes, and tuple member A is a set of areas for the principal simplices of K, and where the transforming step includes:
transforming a first approximation $M^i$ of geometric model M with a progressive simplicial complex transformation to create a second approximation $M^{i-1}$, wherein the first approximation $M^i$ has i-vertices, the second approximation $M^{i-1}$ has i-1 vertices, and the progressive simplicial complex transformation transforms one or more of tuple members $K^i, V^i, D^i$ or $A^i$.

6. The method of claim 1 wherein a tuple ($M^f$, $\{t^1, t^2, \ldots, t^{i-1}\}$) comprises the progressive simplicial complex representation P of the geometric model M and where the transforming step includes re-creating the first approximation $M^i$ from the final approximation $M^f$ by inverting a set of progressive simplicial complex transformations $\{t^1, t^2, \ldots, t^{i-1}\}$.

7. The method of claim 1 wherein the progressive simplicial complex transformation is a progressive simplicial complex vertex unification transformation that can be inverted with a progressive simplicial complex vertex split transformation.

8. A computer-executed method for transforming a geometric model M to create an instance of a progressive simplicial complex approximation of geometric model M, wherein geometric model M comprises a tuple (K, V, D, A) where tuple member K is a simplicial complex, tuple member V is a set of vertex positions that determine the geometric realization of K, tuple member D is a set of simplex attributes, and tuple member A is a set of areas for the principal simplices of K, the method comprising the following steps:
receiving a selection input to unify a vertex $\{b_i\}$ into a vertex $\{a_i\}$ tuple member K; replacing references to $\{b_i\}$ with references to $\{a_i\}$ in the simplices in tuple member K;
deleting vertex $\{b_i\}$ from the set of vertex positions in tuple member V;
propagating a set of simplex attributes in tuple member D associated with simplices for vertex $\{b_i\}$ into simplices associated with vertex $\{a_i\}$; and
redistributing a set of areas in tuple member A for deleted principal simplices associated with deleted vertex $\{b_i\}$ to adjacent simplices in tuple member K.

9. A computer-readable storage medium having stored therein instructions for causing a computer to execute the steps of claim 8.

10. The method of claim 8 wherein the step of replacing references to $\{b_i\}$ with references to $\{a_i\}$ in the simplices in K includes replacing a simplex-s in star($\{b_i\}$) $\subset K^{i+1}$ with a simplex (s\$\{b_i\}$) $\cup \{a_i\}$ where $K^i$ is the i-th approximation of K and $K^{i+1}$ is the (i+1) approximation of tuple member K.

11. The method of claim 8 wherein the step of propagating a set of simplex attributes in tuple member D from vertex $\{b_i\}$ into vertex $\{a_i\}$ includes:
determining if simplex-s is a principal simplex, and if so, propagating simplex attributes from s $\in K^{i+1}$; and if not, propagating simplex attributes from s $\cup \{a_i\} \in K^{i+1}$, where $K^{i+1}$ is the (i+1) approximation of tuple member K.

12. The method of claim 8 wherein the step of redistributing a set of areas in tuple member A for deleted principal simplices associated with deleted vertex $\{b_i\}$ to adjacent simplices in the simplicial complex K includes distributing a the set of areas to a manifold-adjacent simplex not in star($\{a_i, b_i\}$).

13. A computer-executed method for transforming a geometric model M to create an instance of a progressive simplicial complex approximation of geometric model M, wherein geometric model M comprises a tuple (K, V) where tuple member K is a simplicial complex, tuple member V is a set of vertex positions that determine the geometric realization of K, the method comprising the following steps:
receiving a selection input to unify a vertex $\{b_i\}$ into a vertex $\{a_i\}$ in tuple member K;
replacing references to $\{b_i\}$ with references to $\{a_i\}$ in the simplices in tuple member K;
deleting vertex $\{b_i\}$ from the set of vertex positions in tuple member V;
propagating a set of simplex attributes associated with simplices for vertex $\{b_i\}$ into simplices associated with vertex $\{a_i\}$; and
redistributing a set of areas for deleted principal simplices associated with deleted vertex $\{b_i\}$ to adjacent simplices in tuple member K.

14. A computer-readable storage medium having stored therein instructions for causing a computer to execute the steps of claim 13.

15. A computer-executed method for transforming a geometric model M to create an instance of a progressive simplicial complex approximation of geometric model M, wherein geometric model M comprises a tuple (K, V, D, A) where tuple member K is a simplicial complex, tuple member V is a set of vertex positions that determine the geometric realization of K, tuple member D is a set of simplex attributes, and tuple member A is a set of areas for the principal simplices of K, the method comprising the following steps:
receiving a selection input to split a first vertex $\{a_i\}$ in tuple member K;
replacing an ancestor simplex for $\{a_i\}$ with a second vertex $\{b_i\}$ based on a split code associated with the vertex split for vertex $\{a_i\}$ in tuple member K;
assigning a new vertex position in tuple member V for first vertex $\{a_i\}$ and second vertex $\{b_i\}$;
assigning simplex attributes in tuple member D for new principal simplices with first vertex $\{a_i\}$ and second vertex $\{b_i\}$ using simplex attributes from first vertex $\{a_i\}$; and
assigning a set of areas in tuple member A for zero-dimension principal simplices and one-dimension principal simplices for first vertex $\{a_i\}$ and second vertex $\{b_i\}$.

16. A computer-readable storage medium having stored therein instructions for causing a computer to execute the steps of claim 15.

17. The method of claim 15 wherein the step of replacing an ancestor simplex includes replacing an ancestor simplex-s ∈ star ({$a_i$}) in $K^i$, with one of (s), ((s\{$a_i$})∪{i+1}), (s and ((s\{$a_i$})∪{i+1})), or (s, ((s\{$a_i$})∪{i+1} and s\{i+1})) based on the split code, where $K^i$ is the i-th approximation of tuple member K.

18. A computer-executed method for transforming a geometric model M to create an instance of a progressive simplicial complex approximation of geometric model M, wherein geometric model M comprises a tuple (K, V) where tuple member K is a simplicial complex, and tuple member V is a set of vertex positions that determine the geometric realization of K, the method comprising the following steps:

receiving a selection input to split a first vertex {$a_i$} in tuple member K; replacing an ancestor simplex for {$a_i$} with a second vertex {$b_i$} based on a split code associated with the vertex split for vertex {$a_i$} in tuple member K; and assigning a new vertex position in tuple member V for first vertex {$a_i$} and second vertex {$b_i$}.

19. A computer-readable storage medium having stored therein instructions for causing a computer to execute the steps of claim 18.

20. A computer executed method to create a smooth visual transition geomorph $M^G(\alpha)=(K^f, V^G(\alpha), D^f, A^G(\alpha))$ between a coarser geometric model $M^c$ and a finer geometric model $M^f$ from a progressive simplicial complex P which approximates arbitrary geometric model M, where geometric models $M^c=(K^c, V^c, D^c, A^c,)$, $M^f=(K^f, V^f, D^f, A^f)$, and where member K is a simplicial complex, member V is a set of vertex positions that determine the geometric realization of K, member D is a set of simplex attributes, and $0 \leq \alpha \leq 1$, such that $M^G(0)$ looks like coarser geometric model $M^c$, and $M^G(1)$ looks like finer geometric model $M^f$, the method comprising the following steps:

interpolating a set of vertex positions $V^G(\alpha)$ between an original vertex position $v^f$ in a simplicial complex $K^f$ for finer model $M^f$ and an ancestor vertex position $V^c$ in a coarser simplicial complex $K^c$ for coarser model $M^c$;

interpolating a first set of areas for a first set of principal simplices of dimension-zero for the finer progressive simplicial complex $K^f$, interpolating a second set of areas for a second set of principal simplices of dimension-one for the finer simplicial complex $K^f$; and interpolating a third set of areas by finding a set difference of areas of a third set of principal simplices of dimension zero from the coarser simplicial complex $K^c$ and areas of a third set of principal simplices of dimension zero from the finer simplicial complex $K^f$;

interpolating a fourth set of areas by finding a set difference of areas of a fourth set of principal simplices of dimension one from the coarser simplicial complex $K^c$ and areas of fourth a set of principal simplices of dimension one from the finer simplicial complex $K^f$; and using the set of transition positions, and the first, second, third and fourth sets of areas to create the smooth visual transition geomorph model $M^G(\alpha)$ between the coarser model $M^c$ and the finer model $M^f$ for progressive simplicial complex P.

21. A computer-readable storage medium having stored therein instructions for causing a computer to execute the steps of claim 20.

22. A computer executed method for iteratively choosing candidate pairs of vertices to unify in order to construct a progressive simplicial complex P from a progressive mesh representation of an arbitrary geometric model M, where geometric model M comprises a tuple (K, V, D, A), and where member K is a simplicial complex, member V is a set of vertex positions that determine the geometric realization of K, member D is a set of simplex attributes, and member A is a set of areas for the principal simplices of K, the method comprising the following steps:

calculating transformation costs for candidate pairs of vertices from simplicial complex K;

creating a priority queue to store the calculated transformation costs;

performing a transformation using the first item from the priority queue; and updating the priority queue to reflect the performed transformation.

23. A computer-readable storage medium having stored therein instructions for causing a computer to execute the steps claim 22.

24. The method of claim 22 wherein the calculated transformation costs are stored in the priority queue in ascending order.

25. The method of claim 22 wherein the candidate pairs of vertices are selected by computing a triangulation of the vertices of the geometric model M.

26. The method of claim 25 wherein the triangulation is a Delaunay triangulation.

27. The method of claim 22 wherein the step of calculating transformation costs for candidate pairs of vertices for simplicial complex K includes calculating:

$$\Delta E = \Delta E_{dist} + \Delta E_{disc} + E_{\Delta area} + E_{fold}$$

where $\Delta E_{dist}$ measures the geometric accuracy of geometric model M, $\Delta E_{disc}$ measures the geometric accuracy formed by a set of edges of geometric model M, $E_{\Delta area}$ measures surface stretching of geometric model M, and $E_{\Delta fold}$ measures surface folding of geometric model M.

28. The method of claim 22 wherein the transformation is a vertex unify transformation.

29. A computer-executed method for rendering a progressive simplicial complex P which approximates in a progressive mesh representation of an arbitrary geometric model M, where geometric model M comprises a tuple (K, V, D, A) where member K is a simplicial complex, member V is a set of vertex positions that determine the geometric realization of K, member D is a set of simplex attributes, and member A is a set of areas for the principal simplices of K, the method comprising the following steps:

determining a first bounding volume for a principal simplex from simplicial complex K;

projecting a length for the first bounding volume onto screen space for a display device to obtain a second bounding volume in screen space pixels for the display device; and determining whether the principal simplex should be rendered using the second bounding volume.

30. A computer-readable storage medium having stored therein instructions for causing a computer to execute the steps of claim 29.

31. The method of claim 29 wherein the principal simplex complex includes a zero-simplicial complex for dimension zero that approximates a sphere with an area $a_{s0}$ and a one-simplicial complex for dimension one that approximates a cylinder with an area $a_{s1}$.

32. The method of claim 29 wherein the first bounding volume is a first radius $r_{model}$ for geometric model M, and the second bounding volume is a second radius $r_{screen}$ for the screen space of the display device and the step of determining whether the principal simplex should be rendered on the display device using the second bounding volume includes:

determining whether a three-dimensional shape with radius $r_{model}$ should be rendered for the principal simplex based the second radius $r_{screen}$ and if so, rendering the first principal simplex on the display device as a three-dimensional polygonal shape with radius $r_{model}$;

and if not, determining whether the a two-dimensional shape with radius $r_{screen}$ should be rendered for the principal simplex based the second radius $r_{screen}$, and if so, rendering the principal simplex on the display device as a two-dimensional shape.

33. The method of claim 32 wherein the three-dimensional polygonal shape includes one of a sphere or a cylinder.

34. The method of claim 33 wherein the sphere is used for a principal simplex which is a zero-dimension simplex and the cylinder is used for a principal simplex which is a one-dimension simplex.

35. The method of claim 34 wherein the two-dimensional shape includes one of a point or a line with thickness radius $r_{screen}$ multiplied by two.

36. The method of claim 35 wherein the point is used for the principal simplex which is a dimension-zero simplex, and the line is used for the principal simplex which is a dimension-one simplex.

37. A computer-executed method for representing a progressive simplicial complex P which approximates in a progressive mesh representation of an arbitrary geometric model M, where geometric model M comprises a tuple (K, V) where member K is a simplicial complex, and member V is a set of vertex positions that determine the geometric realization of K, the method comprising the following steps:

approximating the geometric model M as a first approximation $M^i$ from the progress mesh representation of M, where $M^i$ has i-vertices;

determining a sequence of vertex unification transformations that simplify $M^i$ with the sequence of approximations $M^{i-1}$, $M^{i-2}$, . . . down to a final approximation $M^f$, where $M^f$ has a predetermined number of vertices;

reversing the sequence of vertex unification transformations;

renumbering the vertex unification transformations in the vertex split transformation sequence with a predetermined numbering sequence;

associating areas with principal two-simplices in the sequence of approximations $M^i$, . . . , $M^f$ equal to a triangle area; and maintaining a sum of areas associated with principal simplices within a manifold component in the sequence of approximations $M^i$, . . . , $M^f$ at a constant value.

38. A computer-readable storage medium having stored therein instructions for causing a computer to execute the steps of claim 37.

39. The method of claim 37 wherein the predetermined number of vertices for the final approximation $M^f$ is one.

40. The method of claim 37 wherein the geometric model M comprises additional tuple members (D,A) where member D is a set of simplex attributes, and member A is a set of areas for the principal simplices of K.

41. A data structure in a memory of a computer system for storing a progressive simplicial complex P created for an arbitrary geometric model M, the data structure including a plurality of data structure members, the data structure comprising:

a data structure member for storing a dimension for a simplex-s for a simplicial complex K;

a data structure member for storing a simplex attribute identifier for the simplex-s;

a data structure member for storing a list of children for the simplex-s; and a data structure member for storing a list of parents for the simplex-s.

42. A computer-executed method for creating a progressive simplicial complex P to generalize a progressive mesh representation of an arbitrary geometric model M, where geometric model M comprises a tuple (K, V, D, A) where member K is a simplicial complex, member V is a set of vertex positions $\{v_1, \ldots v_m\}$ that determine the geometric realization of K in $R^3$ space where $R^3$ is a linear map, member D is a set of simplex attributes $d_f$ associated with two-simplices $f \in K$, and member A is a set of areas that associates an area $a_s \in A$ with principal simplices of K of dimension-zero and dimension-one, the method comprising the following steps:

(a) transforming one or more tuple members ($K^i$, $V^i$, $D^i$, $A^i$) of a first approximation $M^i$ of geometric model M with a progressive simplicial transformation to create a second approximation $M^{i-1}$, where the second approximation $M^{i-1}$ has i–1 vertices, and recording an intermediate set of transformation data associated with the progressive simplicial transformation; and (b) repeating step (a) until a final approximation $M^1$ is created, wherein the final approximation $M^1$ has one vertex and a final set of transformation data, thereby creating a progressive simplicial complex P that approximates geometric model M.

43. A computer-readable storage medium having stored therein instructions for causing a computer to execute the steps of claim 42.

\* \* \* \* \*

UNITED STATES PATENT AND TRADEMARK OFFICE
CERTIFICATE OF CORRECTION

PATENT NO. : 5,966,140

DATED : October 12, 1999

INVENTOR(S) : Popovic, et al.

It is certified that error appears in the above-identified patent and that said Letters Patent is hereby corrected as shown below:

| Col./Line | Error Reads | Should Read |
|---|---|---|
| 7/19 | $\{v_{l,}$ | $\{v_{1,}$ |
| 7/39 | }. }. | }. |
| 9/46 | $t^{i-l}$ | $t^{i-1}$ |
| 12/41 | $K^{i-1}$ | $K^{i+1}$ |
| 13/10 | $v_{pf \to c(j)}$ | $v^c_{pf \to c(j)}$ |
| 14/43 | identifier 12, which | identifier $1^2$, which |
| 15/32 | $C_i^{\Delta\Delta}$. the | $C_i^{\Delta\Delta}$, the |
| 16/53 | $E_{hold}$ | $E_{fold}$ |
| 16/59 | (p, M) | (p, M^) |
| 16/61 | (p, M) | (p, M^) |
| 17/38 | $v^{1+1}a$ | $v^{i+1}a$ |
| 18/27 | $s_1 = \in P_1(K)$ | $s_1 = \{j,k\} \in P_1(K)$ |
| 18/45 | comers | corners |
| 21/23 | $M^{1-1}$ | $M^{i-1}$ |
| 21/30 | $t^{1-1}$ | $t^{i-1}$ |
| 24/32 | $E_{fold}$ | $E_{\Delta fold}$ |

Signed and Sealed this

Twenty-ninth Day of May, 2001

Attest:

NICHOLAS P. GODICI

*Attesting Officer*   *Acting Director of the United States Patent and Trademark Office*